(12) United States Patent
Fujioka

(10) Patent No.: US 12,162,527 B2
(45) Date of Patent: Dec. 10, 2024

(54) DRIVE WHEEL AND CART

(71) Applicant: NSK Ltd., Tokyo (JP)

(72) Inventor: Ko Fujioka, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/037,186

(22) PCT Filed: Jan. 17, 2022

(86) PCT No.: PCT/JP2022/001303
§ 371 (c)(1),
(2) Date: May 16, 2023

(87) PCT Pub. No.: WO2022/224507
PCT Pub. Date: Oct. 27, 2022

(65) Prior Publication Data
US 2023/0406387 A1    Dec. 21, 2023

(30) Foreign Application Priority Data

Apr. 20, 2021   (JP) ................... 2021-070938

(51) Int. Cl.
*B62B 5/00*     (2006.01)
*B62B 3/00*     (2006.01)
(Continued)

(52) U.S. Cl.
CPC ............ *B62B 5/0066* (2013.01); *B62B 3/001* (2013.01); *B62B 5/0043* (2013.01); *F16H 1/222* (2013.01); *F16H 1/24* (2013.01); *B62B 2301/044* (2013.01)

(58) Field of Classification Search
CPC ..... B62B 5/0066; B62B 3/001; B62B 5/0043; B62B 2301/044; F16H 1/222; F16H 1/24
See application file for complete search history.

(56) References Cited

U.S. PATENT DOCUMENTS 4,461,367 A * 7/1984 Eichinger ............ B60K 17/145
                                                    180/252
4,778,024 A * 10/1988 Matsumoto .............. B62D 1/28
                                                    180/211
(Continued)

FOREIGN PATENT DOCUMENTS

JP    2020024033 A  *  2/2020
WO   2010/147100 A1    12/2010

OTHER PUBLICATIONS

International Search Report for PCT/JP2022/001303 dated Mar. 22, 2022.

(Continued)

*Primary Examiner* — Kevin Hurley
*Assistant Examiner* — Michael R Stabley
(74) *Attorney, Agent, or Firm* — Sughrue Mion, PLLC

(57) ABSTRACT

A drive wheel in which the rotational axial center of a wheel along the vertical direction intersecting the axial center of the axle is arranged shifted in the horizontal direction orthogonal to the axial center of the axle with respect to the axial center of the pivot shaft. When a radius $R1$ of the wheel, center distance $R2$ between the rotational axial center and the axial center of the pivot shaft, rotational frequency $n1$ of the wheel, rotational frequency $n2$ of the pivot shaft, rotational speed $V1$ of the wheel, and steering rotational speed $V2$ of the wheel rolling on a floor surface while turning the pivot shaft satisfy $V1=V2$, relations of $V1=2\pi \times R1 \times n1$, $V2=2\pi \times R2 \times n2$, and $n1=n2\,(R2/R1)$ are satisfied.

8 Claims, 14 Drawing Sheets

(51) Int. Cl.
*F16H 1/22* (2006.01)
*F16H 1/24* (2006.01)

(56) References Cited

U.S. PATENT DOCUMENTS

| | | | | |
|---|---|---|---|---|
| 5,128,598 | A * | 7/1992 | Avitan | B60K 7/0007 318/587 |
| 5,862,874 | A * | 1/1999 | Brienza | B62D 7/026 180/6.48 |
| 6,349,781 | B1 * | 2/2002 | Kruse | B66F 9/07572 180/65.6 |
| 6,491,127 | B1 * | 12/2002 | Holmberg | B62D 7/026 301/6.5 |
| 7,789,175 | B2 * | 9/2010 | Tobey | B60B 27/0021 180/6.48 |
| 8,424,627 | B2 * | 4/2013 | Kuo | B60K 7/0007 180/371 |
| 8,590,664 | B2 | 11/2013 | Terashima et al. | |
| 9,108,665 | B2 * | 8/2015 | Amino | B60G 11/14 |
| 9,789,902 | B1 * | 10/2017 | Cui | B62D 7/1545 |
| 11,066,090 | B2 * | 7/2021 | Johnson | B62B 3/10 |
| 2001/0008985 | A1 * | 7/2001 | Wada | G05D 1/0272 701/1 |
| 2005/0236208 | A1 * | 10/2005 | Runkles | B60K 17/303 180/254 |
| 2007/0256868 | A1 * | 11/2007 | Romig | B62D 7/023 180/6.5 |
| 2011/0024219 | A1 * | 2/2011 | Jorgensen | B62D 5/0418 475/336 |

OTHER PUBLICATIONS

Notice of Reason for Refusal issued by the Japanese Patent Office in Japanese Patent Application No. 2022-541204, dated Oct. 11, 2022.
Decision of Refusal issued by the Japanese Patent Office in Japanese Patent Application No. 2022-541204, dated Feb. 7, 2023.
Decision to Grant a Patent issued by the Japanese Patent Office in Japanese Patent Application No. 2022-541204, dated May 11, 2023.

* cited by examiner

DRIVE WHEEL AND CART

CROSS REFERENCE TO RELATED APPLICATIONS

This application is a National Stage of International Application No. PCT/JP2022/001303 filed Jan. 17, 2022, claiming priority based on Japanese Patent Application No. 2021-070938 filed Apr. 20, 2021.

FIELD

The present invention relates to a drive wheel and a cart.

BACKGROUND

Patent Literature 1 discloses a drive wheel and a cart with drive wheels. The drive wheel includes a first input shaft and a second input shaft coaxially disposed, a first output shaft and a second output shaft disposed on different axes, a first spur gear mechanism that transmits the rotational force of the first input shaft to the first output shaft, a second spur gear mechanism that transmits the rotational force of the second input shaft to the second output shaft, a wheel connected to an axle, a pivot shaft that supports the wheel in a pivotable manner via the axle, a first power conversion mechanism that transmits the rotational force of the first output shaft to one end portion of the axle, and a second power conversion mechanism that transmits the rotational force of the second output shaft to the other end portion of the axle. Moreover, in the drive wheel, the rotational axial center of the wheel along the vertical direction intersecting the axial center direction of the axle, is preferably arranged offset in the horizontal direction orthogonal to the axial center direction of the axle with respect to the axial center of the pivot shaft.

CITATION LIST

Patent Literature

Patent Literature 1: Japanese Patent Application Laid-open No. 2020-024033 A

SUMMARY

Technical Problem

Either to change the direction of the wheel or to rotate the wheel, the drive wheel disclosed in Reference 1 is capable of simultaneously operating the two driving devices installed therein, while simplifying the structure and ensuring a sufficient minimum ground clearance. Then, in the drive wheel, by offsetting the wheel, when the wheel is not being driven, it is possible to passively turn the wheel by the external force applied from the horizontal direction.

In this example, in the drive wheel in which the wheel is offset with respect to the pivot shaft, in a relation between the turning radius and the wheel radius based on the offset amount, for example, when the turning radius is equal to the wheel radius, the rotational speed of the wheel becomes equal to the turning speed, thereby increasing the turning radius and increasing an area occupied by the drive wheel. Moreover, when the turning radius is equal to the wheel radius, it becomes difficult to manually steer the wheel by passive turning. By taking the above problems into consideration, when the wheel radius is increased than the turning radius, the rotational speed of the wheel becomes greater than the turning speed. This makes it difficult to control the course change of the drive wheel. Hence, the drive wheel is controlled such that the rotational speed is suppressed. As a result, the drive wheel in an offset mode cannot obtain the maximum rotational frequency output from the driving source, thereby reducing the efficiency.

The present disclosure has been made in view of the above problems, and an object of the present disclosure is to provide a drive wheel and a cart that can improve the driving efficiency, in a mode in which the wheel is offset with respect to the pivot shaft.

Solution to Problem

To achieve the above object, a drive wheel according to an embodiment of the present disclosure, comprising: a first input shaft and a second input shaft coaxially disposed; a first output shaft and a second output shaft disposed on different axes; a first transmission mechanism that transmits rotational force of the first input shaft to the first output shaft; a second transmission mechanism that transmits rotational force of the second input shaft to the second output shaft; a wheel connected to an axle; a pivot shaft that supports the wheel in a pivotable manner via the axle; a first power conversion mechanism that transmits the rotational force of the first output shaft to one end portion of the axle; and a second power conversion mechanism that transmits the rotational force of the second output shaft to another end portion of the axle, a rotational axial center of the wheel along a vertical direction intersecting an axial center of the axle being arranged shifted in a horizontal direction orthogonal to the axial center of the axle with respect to an axial center of the pivot shaft, wherein when a radius $R1$ of the wheel, center distance $R2$ between the rotational axial center and the axial center of the pivot shaft, rotational frequency $n1$ of the wheel, rotational frequency $n2$ of the pivot shaft, rotational speed $V1$ of the wheel, and steering rotational speed $V2$ of the wheel rolling on a floor surface while turning the pivot shaft satisfy $V1=V2$, relations of $V1=2\pi \times R1 \times n1$, $V2=2\pi \times R2 \times n2$, and $n1=n2 \, (R2/R1)$ are satisfied.

As a desirable embodiment of the drive wheel, a reduction ratio of the first power conversion mechanism and the second power conversion mechanism or a gear ratio of meshing gears of the first power conversion mechanism and the second power conversion mechanism is in a relation of $(R2/R1) \pm 10\%$.

As a desirable embodiment of the drive wheel, a reduction ratio of the first transmission mechanism and the second transmission mechanism or a gear ratio of meshing gears of the first transmission mechanism and the second transmission mechanism is in a relation of $R2/R1$.

As a desirable embodiment of the drive wheel, the first output shaft and the second output shaft are arranged on both sides in an axial center direction of the axle with respect to the wheel.

As a desirable embodiment of the drive wheel, the first power conversion mechanism and the second power conversion mechanism are arranged on both sides in the axial center direction of the axle with respect to the wheel.

As a desirable embodiment of the drive wheel, the first power conversion mechanism and the second power conversion mechanism are arranged on an upper side in a vertical direction intersecting the axial center direction of the axle.

As a desirable embodiment of the drive wheel, a first power transmission mechanism is provided between the first power conversion mechanism and one end portion of the axle, and a second power transmission mechanism is provided between the second power conversion mechanism and another end portion of the axle.

As a desirable embodiment of the drive wheel, the first power conversion mechanism transmits the rotational force of the first output shaft to one end portion of the axle the axial center direction of which is different from that of the first output shaft, and to which one of a bevel gear mechanism, a helical gear mechanism, a worm gear mechanism, a crown gear mechanism, and a universal joint mechanism is applied, and the second power conversion mechanism transmits the rotational force of the second output shaft to one end portion of the axle the axial center direction of which is different from that of the second output shaft, and to which one of a bevel gear mechanism, a helical gear mechanism, a worm gear mechanism, a crown gear mechanism, and a universal joint mechanism is applied.

As a desirable embodiment of the drive wheel, in the pivot shaft, a first support member and a second support member are connected to both sides in the axial center direction of the axle with respect to the wheel, and in the axle, end portions in the axial center direction are rotatably supported by the first support member and the second support member.

To achieve the above object, A cart according to an embodiment of the present disclosure, comprising: the drive wheel above, and a cart main body to which the drive wheel is fitted.

Advantageous Effects of Invention

According to the present disclosure, in a mode in which the wheel is offset with respect to the pivot shaft, it is possible to improve the driving efficiency.

DESCRIPTION OF EMBODIMENTS

Hereinafter, embodiments for carrying out the invention will be described in detail with reference to the accompanying drawings. However, the present invention is not limited to the following embodiments. Moreover, components in the following embodiments include components that can be easily assumed by those skilled in the art, components that are substantially the same, and components within a so-called range of equivalents. Furthermore, the components disclosed in the following embodiments may be combined with each other as appropriate.

Embodiment

Figure 14:
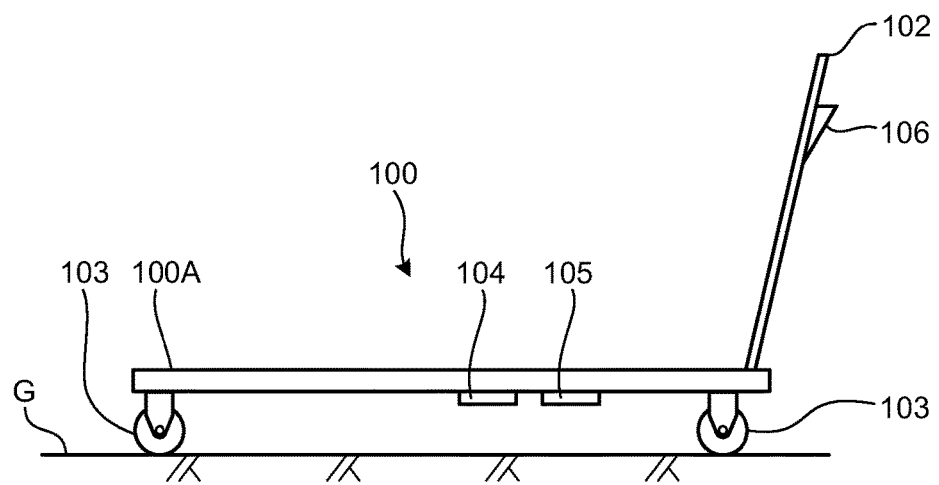
FIG. 14 is a schematic diagram illustrating a configuration example of a cart.

FIG. 14 is a schematic diagram illustrating a configuration example of a cart.

As illustrated in FIG. 14, a cart 100 includes a cart main body 100A, a handle part 102, four drive wheels 103, a power supply unit 104, a control device 105, and an operation unit 106.

For example, the cart main body 100A is a flat plate material, and formed in a rectangular shape in a plan view. The handle part 102 is fixed to one side of the cart main body 100A in the longitudinal direction. The four drive wheels 103 are attached to four corners of the cart main body 100A on the back surface side. The four drive wheels 103 can be rotated and steered. Moreover, the power supply unit 104 and the control device 105 are attached to the back surface of the cart main body 100A between the front and back drive wheels 103, and the operation unit 106 is attached to the handle part 102. The control device 105 includes a computer system. The computer system includes a processor such as a CPU, and a memory such as a ROM or a RAM.

Thus, in the cart 100, the control device 105 to which an operation signal from the operation unit 106 is input, controls the drive wheels 103. Consequently, the cart 100 can travel and turn automatically. The operation unit 106 may not be provided on the cart 100 (handle part 102), and may also be configured as a remote control device away from the cart 100. Consequently, the cart 100 can be controlled remotely by wire or wireless.

Because the cart main body 100A is formed in a flat surface, an object to be transported can be placed on the flat surface. That is, the cart 100 can be configured as an Automatic Guided Vehicle (AGV). Moreover, the cart 100 may be configured as equipment that travels by placing an instrument along the flat surface of the cart main body 100A. For example, the equipment includes various types such as a hand lift, forklift, picking robot, and medical instrument.

In the cart 100 and equipment, the number and arrangement of the drive wheels 103 are not limited to the configuration described above. For example, in the cart 100 and equipment with four wheels as described above, a pair of the drive wheels 103 may be fitted to the front side of the cart 100, and driven wheels (single-axis driven wheels that do not turn) may be fitted to the rear side of the cart 100. Moreover, although not illustrated in the drawing, in the cart 100 and equipment with three wheels or more, there may be only one drive wheel 103, and all other wheels may be driven wheels. Furthermore, although not illustrated in the drawing, in the cart 100 and equipment with three wheels or more, all of the wheels may be the drive wheels 103 and there may not be a driven wheel. That is, in the cart 100 and equipment with three wheels or more, there may be at least one drive wheel 103.

Figure 1:
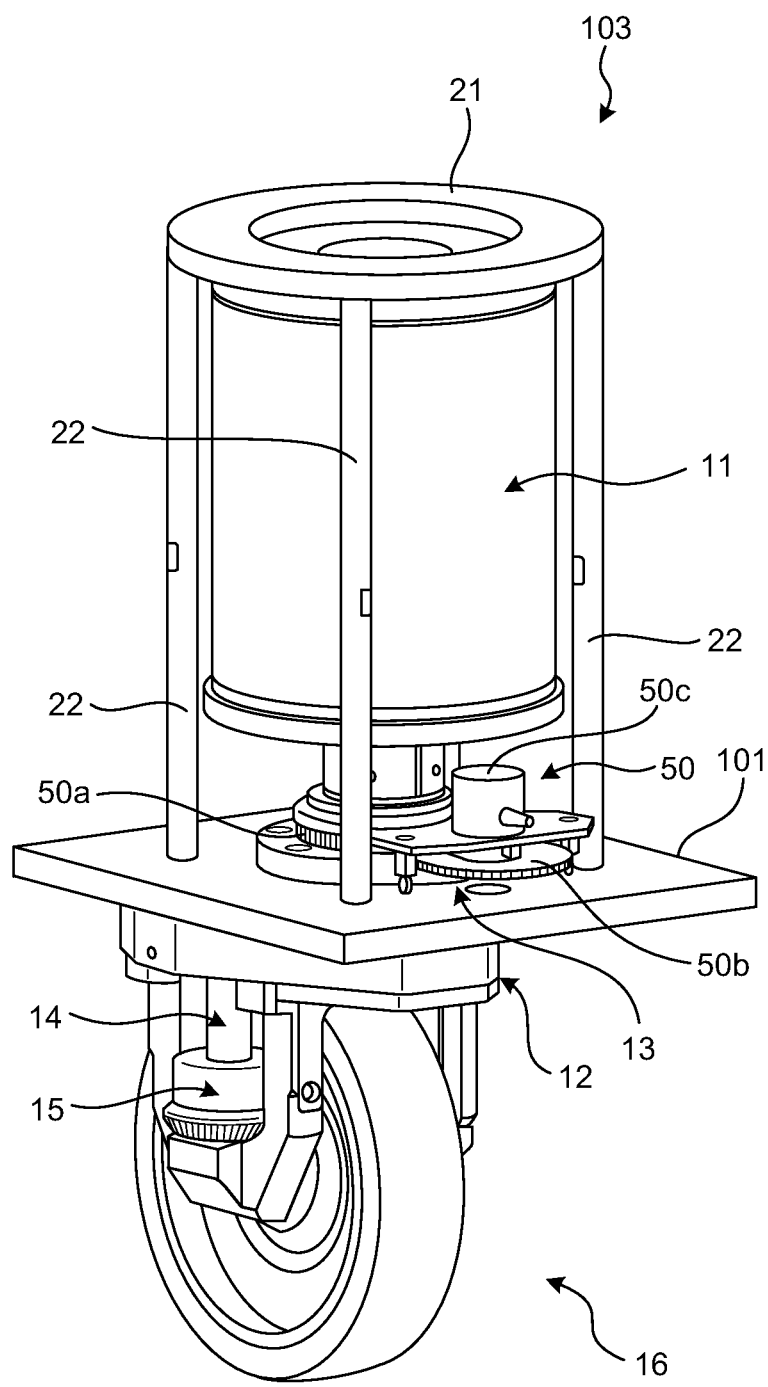
FIG. 1 is a perspective view illustrating a configuration example of a drive wheel.
Figure 2:
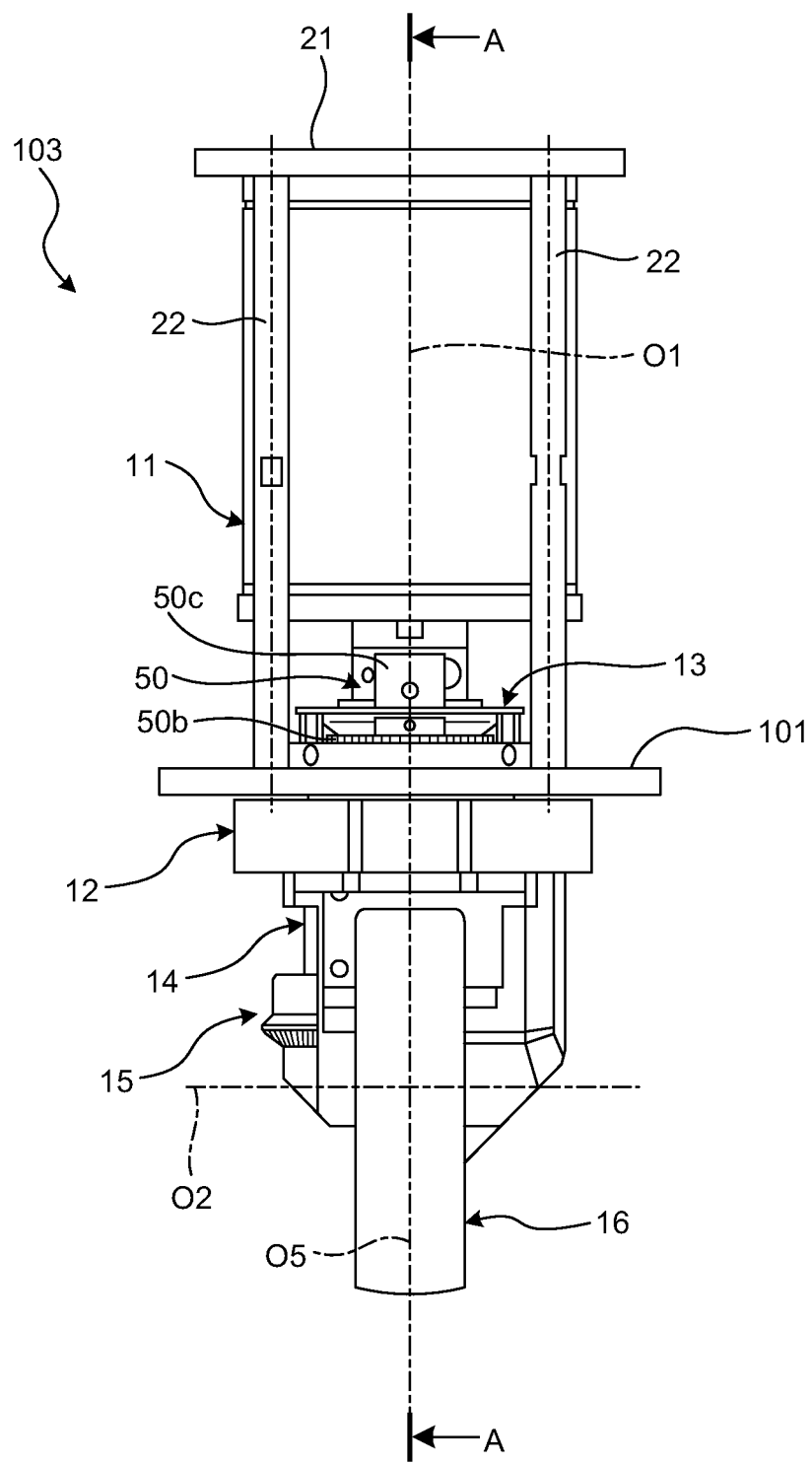
FIG. 2 is a front view illustrating the drive wheel.
Figure 3:
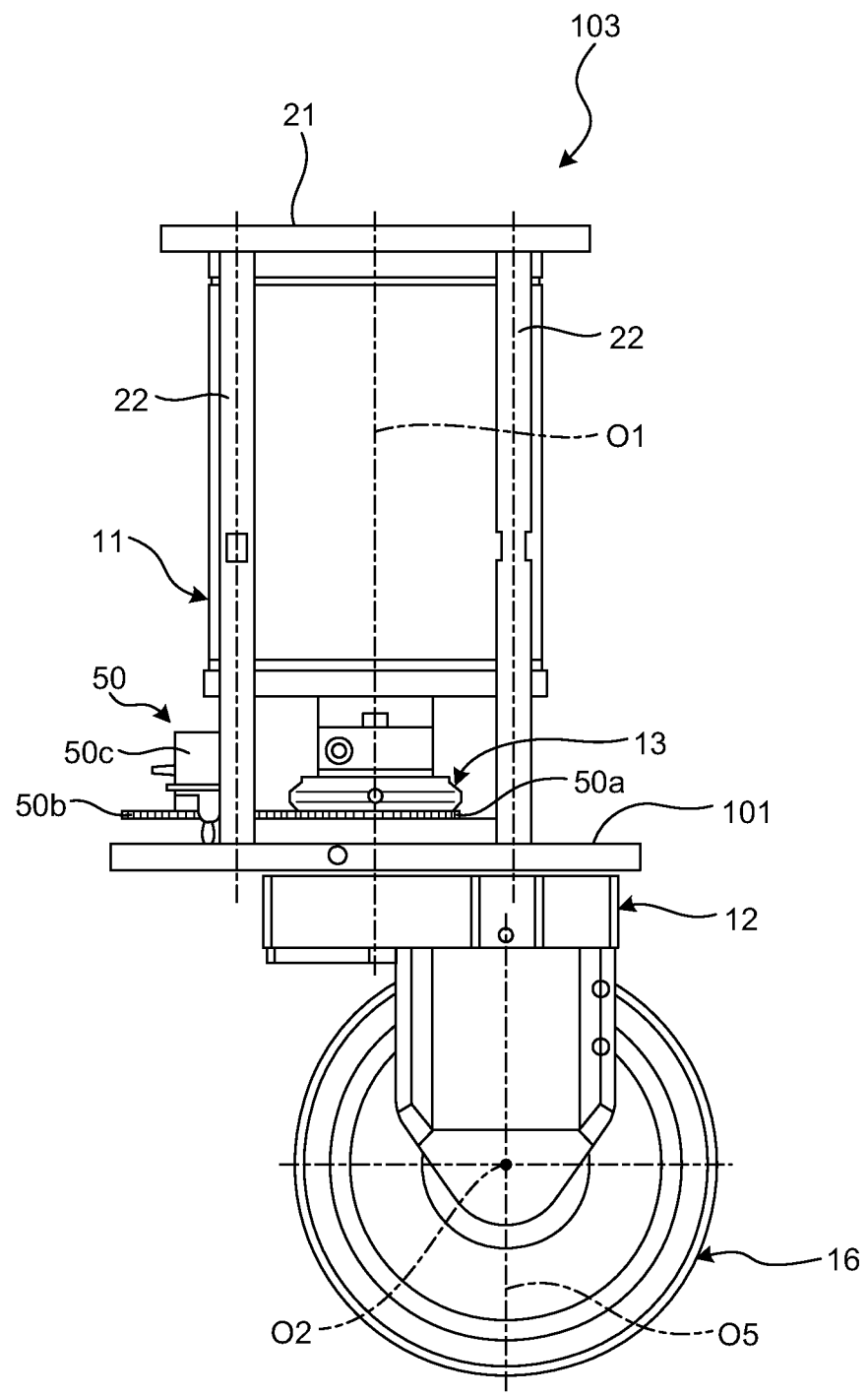
FIG. 3 is a side view illustrating the drive wheel.

Hereinafter, the drive wheel 103 will be described in detail. FIG. 1 is a perspective view illustrating a configuration example of a drive wheel. FIG. 2 is a front view illustrating the drive wheel. FIG. 3 is a side view illustrating the drive wheel.

As illustrated in FIG. 1 through FIG. 3, the drive wheel 103 includes an input unit 11, a turning part 12, a spur gear mechanism (transmission mechanism) 13, an output unit 14, a bevel gear mechanism 15 serving as a power conversion mechanism, and a wheel 16.

The input unit 11 is arranged above a main body 101. The upper end portion of the input unit 11 is fixed to a substrate 21, and the substrate 21 is supported onto the main body 101 by a plurality (four in this example) of support columns 22. The lower portion of the input unit 11 extends downward through the main body 101. The turning part 12 is arranged outside the lower portion of the input unit 11, and the lower portion shifted in the horizontal direction extends downward through the main body 101. The spur gear mechanism 13 transmits the rotational force of the input unit 11. The output unit 14 is rotated by the rotational force input from the input unit 11. The bevel gear mechanism 15 transmits the rotational force of the output unit 14 to the wheel 16. The wheel 16 can be rotated by the input rotational force and can be steered.

Figure 4:
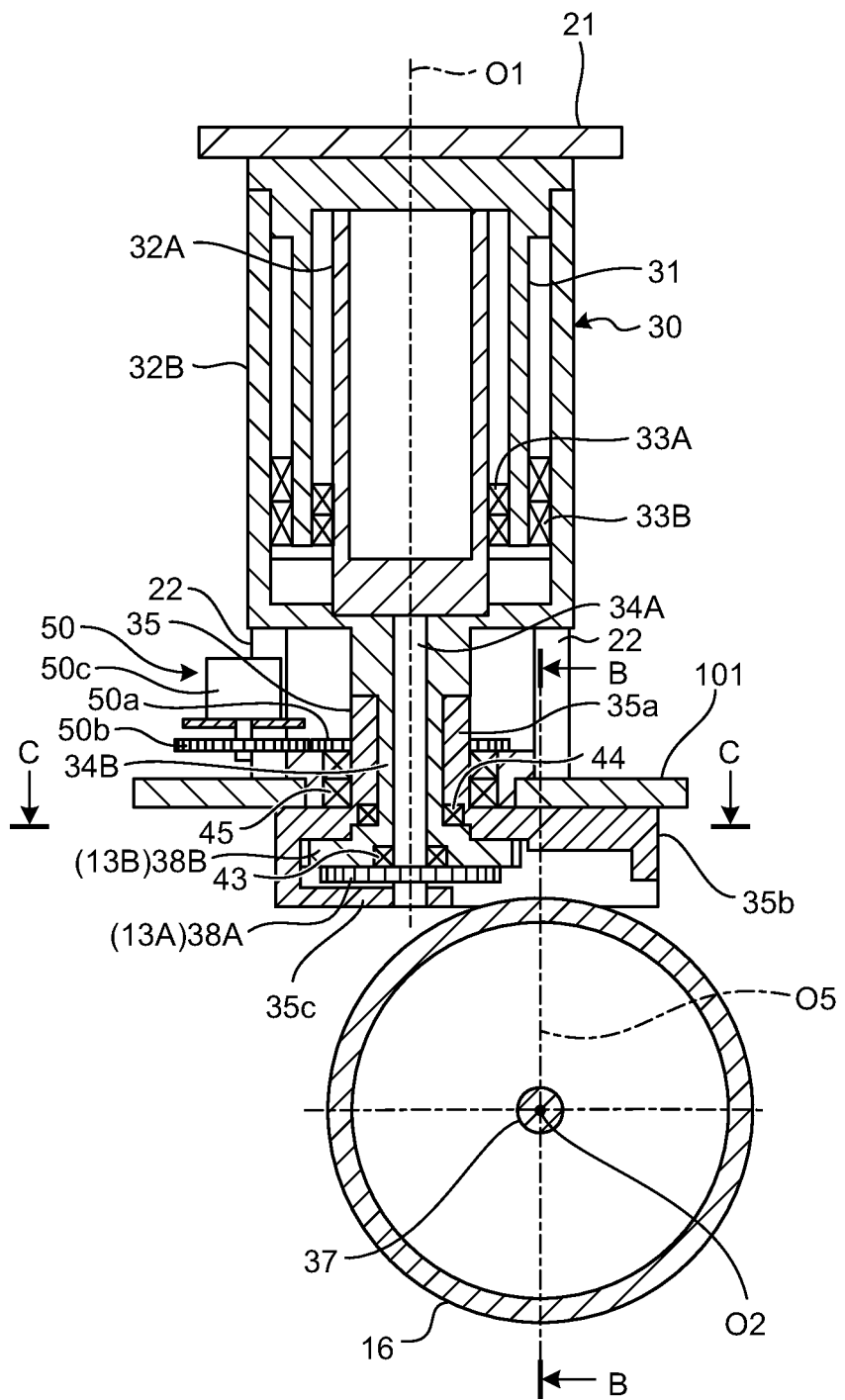
FIG. 4 is a sectional view cut along a line A-A in FIG. 2.
Figure 5:
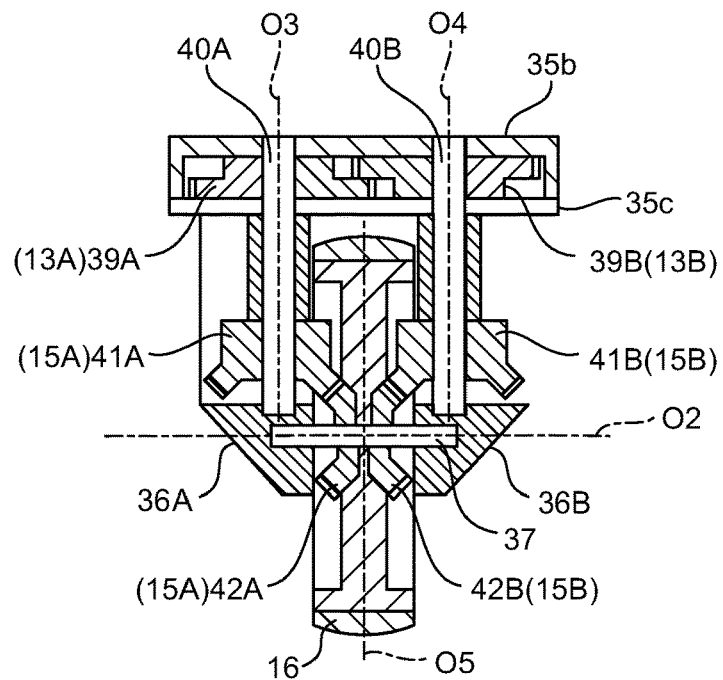
FIG. 5 is a sectional view cut along a line B-B in FIG. 4.
Figure 6:
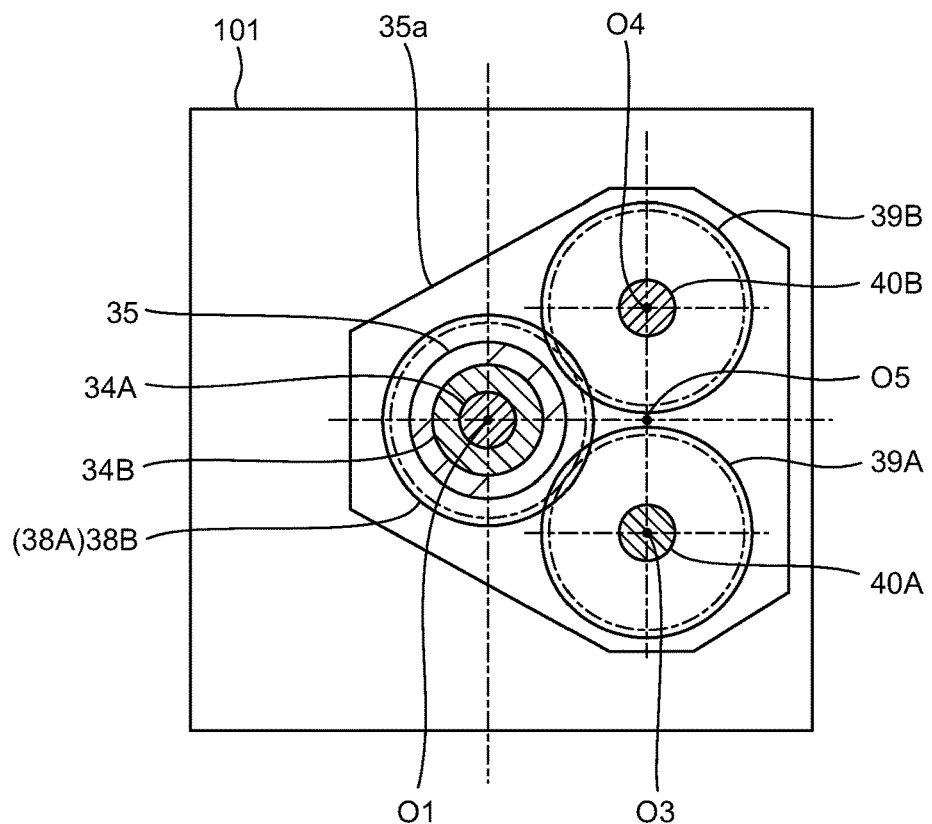
FIG. 6 is a sectional view cut along a line C-C in FIG. 4.

Hereinafter, the input unit 11, the turning part 12, the spur gear mechanism 13, the output unit 14, the bevel gear mechanism 15, and the wheel 16 will be described in detail. FIG. 4 is a sectional view cut along a line A-A in FIG. 2. FIG. 5 is a sectional view cut along a line B-B in FIG. 4. FIG. 6 is a sectional view cut along a line C-C in FIG. 4.

As illustrated in FIG. 4 through FIG. 6, the input unit 11 includes a dual shaft integrated motor 30, and can supply two rotational forces to the pivot center of the wheel 16. That is, a support cylinder 31 formed in a cylindrical shape is fixed to the lower portion of the substrate 21. A first rotating cylinder 32A is rotatably supported by the inside of the support cylinder 31 by a bearing 33A around an axial center O1. A second rotating cylinder 32B is rotatably supported by the outside by a bearing 33B around the axial center O1. A coil (not illustrated) is provided on the inner peripheral surface and outer peripheral surface of the support cylinder 31. A magnet (not illustrated) is provided on the outer peripheral surface of the first rotating cylinder 32A, and a first input shaft 34A that extends along the axial center O1 direction is provided on the lower portion. A magnet (not illustrated) is provided on the inner peripheral surface of the second rotating cylinder 32B, and a second input shaft 34B that extends along the axial center O1 direction is provided on the lower portion. The second input shaft 34B is formed in a cylindrical shape, and is arranged outside the first input shaft 34A. The first input shaft 34A and the second input shaft 34B extend downward through the main body 101. The input unit 11 includes the motor 30 having the support cylinder 31, the first rotating cylinder 32A, and the second rotating cylinder 32B, and includes the first input shaft 34A and the second input shaft 34B. Therefore, when each coil in the support cylinder 31 is energized, the first input shaft 34A can be rotated via the first rotating cylinder 32A, and the second input shaft 34B can be rotated via the second rotating cylinder 32B. On the other hand, when each coil in the support cylinder 31 is not energized, the first rotating cylinder 32A and the first input shaft 34A are rotatable with respect to the support cylinder 31, and the second rotating cylinder 32B and the second input shaft 34B are rotatable with respect to the support cylinder 31. A pivot shaft 35 is arranged outside the second input shaft 34B.

The pivot shaft 35 is formed in a cylindrical shape, is arranged outside the second input shaft 34B, extends along the axial center O1 direction, and is rotatably supported around the axial center O1. That is, the first input shaft 34A, the second input shaft 34B, and the pivot shaft 35 are coaxially and rotatably disposed along the axial center O1. A bearing 43 is provided between the first input shaft 34A and the second input shaft 34B, a bearing 44 is provided between the second input shaft 34B and the pivot shaft 35, and a bearing 45 is provided between the pivot shaft 35 and the main body 101. The pivot shaft 35 includes a main body 35a formed in a cylindrical shape and a flange part 35b integrally provided on the lower portion of the main body 35a. A cover member 35c is provided on the lower portion of the flange part 35b. In the pivot shaft 35, a first support member 36A and a second support member 36B are provided on the lower portion of the cover member 35c and on both sides of the wheel 16 in the horizontal direction so as to extend downward. In the wheel 16, an axle 37 along an axial center O2 direction orthogonal to the axial center O1 direction is integrally provided on a position shifted from the center in the horizontal direction. In the axle 37, one end portion along the axial center O2 direction is rotatably supported by the lower portion of the first support member 36A, and the other end portion along the axial center O2 direction is rotatably supported by the lower portion of the second support member 36B. The turning part 12 includes the pivot shaft 35, the first support member 36A, and the second support member 36B. Therefore, a rotational axial center O5 of the wheel 16 along the vertical direction intersecting the axial center O2 direction of the axle 37, is arranged shifted in the horizontal direction orthogonal to the axial center O2 direction of the axle 37 with respect to the axial center O1 of the pivot shaft 35.

A first drive spur gear 38A is fixed to the lower end portion of the first input shaft 34A, and a second drive spur gear 38B is fixed to the lower end portion of the second input shaft 34B. The first drive spur gear 38A meshes with a first driven spur gear 39A, and the second drive spur gear 38B meshes with a second driven spur gear 39B. The second drive spur gear 38B and the first drive spur gear 38A are stacked vertically and rotate around the axial center O1. The first driven spur gear 39A is fixed to the upper portion of a first output shaft 40A. The upper portion of the first output shaft 40A is supported through the flange part 35b and the cover member 35c of the pivot shaft 35, and the lower portion of the first output shaft 40A is supported by the first support member 36A. The first output shaft 40A is rotatably supported around an axial center O3. The second driven spur gear 39B is fixed to the upper portion of a second output shaft 40B. The upper portion of the second output shaft 40B is supported through the flange part 35b and the cover member 35c of the pivot shaft 35, and the lower portion of the second output shaft 40B is supported by the second support member 36B. The second output shaft 40B is rotatably supported around an axial center O4. The axial center O3 and the axial center O4 are parallel to the axial center O1. In this example, the first drive spur gear 38A, the second drive spur gear 38B, the first driven spur gear 39A, and the second drive spur gear 38B are covered by the pivot shaft 35 and the cover member 35c.

The first driven spur gear 39A, the first drive spur gear 38A, the second drive spur gear 38B, and the second driven spur gear 39B are arranged such that the axial center O1, the axial center O3, and the axial center O4 form a triangle. That is, the rotational axial center O5 of the wheel 16 is arranged shifted in the horizontal direction orthogonal to the axial center O2 direction of the axle 37 with respect to the axial center O1 of the pivot shaft 35. Then, the first driven spur gear 39A and the first output shaft 40A, and the second driven spur gear 39B and the second output shaft 40B are arranged on both sides in the axial center O2 direction of the axle 37 with respect to the wheel 16. The pitch circle diameter, the tooth form, the number of teeth, and the like of the spur gears 38A, 38B, 39A, and 39B are the same. However, the pitch circle diameter, the tooth form, the number of teeth, and the like of the spur gears 38A, 38B, 39A, and 39B may also be different from each other. For example, the drive spur gears 38A and 38B, and the driven spur gears 39A and 39B may be formed in different shapes. The spur gear mechanism 13 includes a first spur gear mechanism (first transmission mechanism) 13A and a second spur gear mechanism (second transmission mechanism) 13B. The first spur gear mechanism 13A includes the first drive spur gear 38A and the first driven spur gear 39A. The second spur gear mechanism 13B includes the second drive spur gear 38B and the second driven spur gear 39B. Moreover, the output unit 14 includes the first output shaft 40A and the second output shaft 40B.

A first drive bevel gear 41A is fixed to the lower portion of the first output shaft 40A, and a second drive bevel gear 41B is fixed to the lower portion of the second output shaft 40B. On the other hand, in the axle 37, a first driven bevel gear 42A is fixed to one end portion in the axial center O2 direction, and a second driven bevel gear 42B is fixed to the other end portion in the axial center O2 direction. The first drive bevel gear 41A meshes with the first driven bevel gear 42A. The second drive bevel gear 41B meshes with the second driven bevel gear 42B. The bevel gear mechanism 15 includes a first bevel gear mechanism 15A serving as a first power conversion mechanism, and a second bevel gear mechanism 15B serving as a second power conversion mechanism. The first bevel gear mechanism 15A includes the first drive bevel gear 41A and the first driven bevel gear 42A. The second bevel gear mechanism 15B includes the second drive bevel gear 41B and the second driven bevel gear 42B.

The drive wheel 103 can rotate and steer the wheel 16 by rotating the first input shaft 34A and the second input shaft 34B by the motor 30 via the first rotating cylinder 32A and the second rotating cylinder 32B. That is, the wheel 16 can be rotated without steering, by rotating the first input shaft 34A and rotating the second input shaft 34B in the opposite direction of the first input shaft 34A, and by setting the rotational frequencies (rotational speed) of the first input shaft 34A and the second input shaft 34B to be the same. In this process, by setting the rotational frequency (rotational speed) of the first input shaft 34A and the second input shaft 34B different from each other, it is possible to steer the wheel 16 in a rotating state or in a stopped state.

Figure 7:
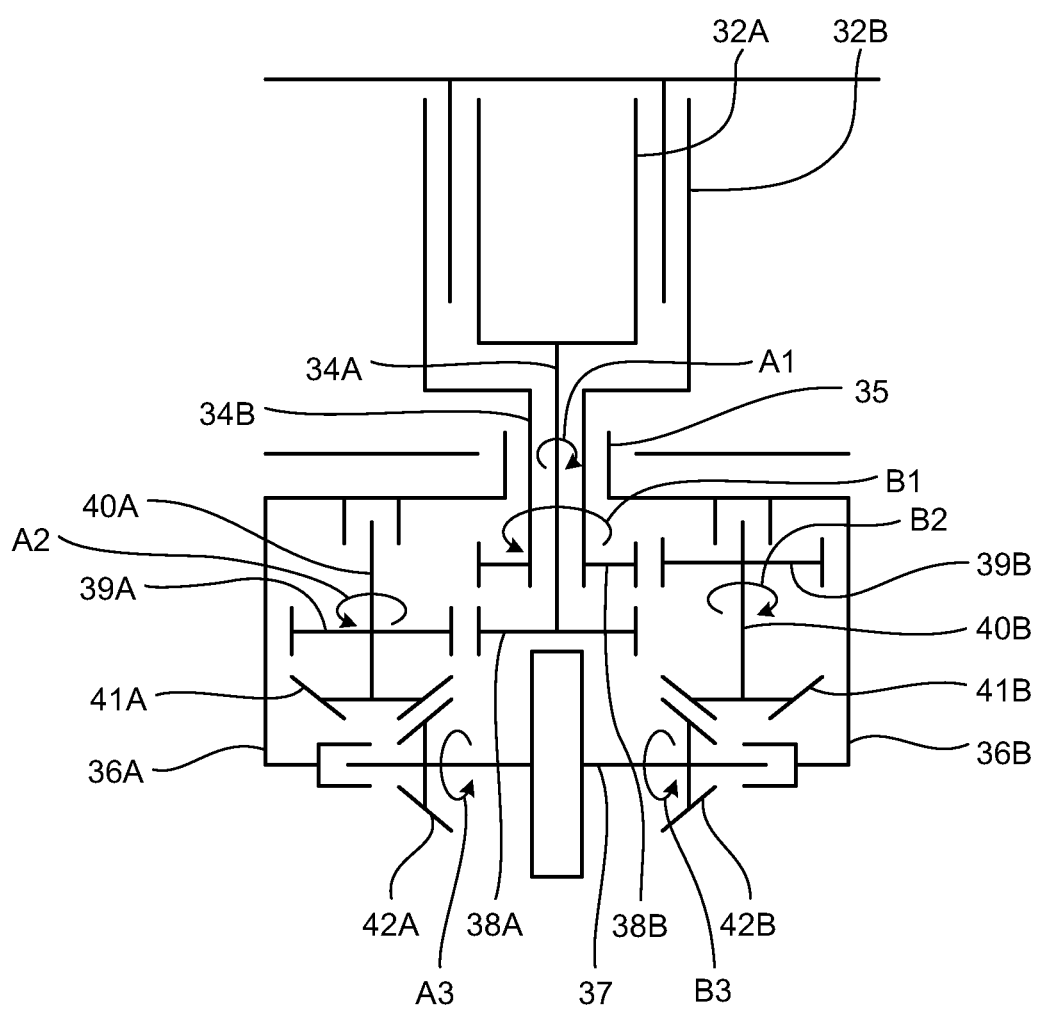
FIG. 7 is a schematic view illustrating a driving force transmission passage of the drive wheel.

An operation of the drive wheel 103 will now be explained. FIG. 7 is a schematic view illustrating a driving force transmission passage of the drive wheel.

In the drive wheel 103, as illustrated in FIG. 7, when the first input shaft 34A is rotated in a first direction A1, the first drive spur gear 38A is rotated in the same direction, and rotates the first driven spur gear 39A meshing with the first drive spur gear 38A in a second direction A2. When the first driven spur gear 39A is rotated in the second direction A2, the first drive bevel gear 41A integrally provided with the first driven spur gear 39A via the first output shaft 40A rotates in the same direction. Then, the first driven bevel gear 42A meshing with the first drive bevel gear 41A is rotated in a third direction A3, and causes the axle 37 integrated with the first driven bevel gear 42A to rotate in the same direction. On the other hand, when the second input shaft 34B is rotated in a first direction B1 that is opposite from the first direction A1, the second drive spur gear 38B is rotated in the same direction, and rotates the second driven spur gear 39B meshing with the second drive spur gear 38B in a second direction B2. When the second driven spur gear 39B is rotated in the second direction B2, the second drive bevel gear 41B integrally provided with the second driven spur gear 39B via the second output shaft 40B rotates in the same direction. Then, the second driven bevel gear 42B meshing with the second drive bevel gear 41B is rotated in a third direction B3, and causes the axle 37 integrated with the second driven bevel gear 42B to rotate in the same direction. In this example, the third direction A3 and the third direction B3 are in the same rotation direction. Hence, if the rotational frequencies of the first input shaft 34A and the second input shaft 34B are the same, the wheel 16 rotates without turning.

In this process, if the rotational frequency of the second input shaft 34B is reduced than the rotational frequency of the first input shaft 34A, the rotational frequency input to the axle 37 from the second drive bevel gear 41B via the second driven bevel gear 42B becomes lower than the rotational frequency input to the axle 37 from the first drive bevel gear 41A via the first driven bevel gear 42A. Then, the pivot shaft 35 is rotated by the difference in the rotational frequencies, and the wheel 16 is steered to turn. Moreover, when the rotation of the second input shaft 34B is stopped, the rotational frequency input to the axle 37 from the second drive bevel gear 41B via the second driven bevel gear 42B becomes zero, and the wheel 16 is steered to turn without rotating.

That is, when the gear ratios of the spur gears 38A, 38B, 39A, and 39B are the same and the gear ratios of the bevel gears 41A, 41B, 42A, and 42B are the same, and when the rotational frequency of the first input shaft 34A is NA, the rotational frequency of the second input shaft 34B is NB, the rotational frequency of the pivot shaft 35 is NS, and the rotational frequency of the wheel 16 is NW, the rotational frequency NS of the pivot shaft 35 and the rotational frequency NW of the wheel 16 satisfy the relations of the following formulae.

$$NW = (½)NA - (½)NB$$

$$NS = -(½)NA - (½)NB$$

$$NA = NW - NS$$

$$NB = -NW - NS$$

In this manner, the drive wheel 103 includes the first input shaft 34A and the second input shaft 34B coaxially disposed, the first output shaft 40A and the second output shaft 40B disposed on different axes, the first spur gear mechanism 13A that transmits the rotational force of the first input shaft 34A to the first output shaft 40A, the second spur gear mechanism 13B that transmits the rotational force of the second input shaft 34B to the second output shaft 40B, the wheel 16 connected to the axle 37, the pivot shaft 35 that supports the wheel 16 in a pivotable manner via the axle 37, the first bevel gear mechanism 15A that transmits the rotational force of the first output shaft 40A to one end portion of the axle 37, and the second bevel gear mechanism 15B that transmits the rotational force of the second output shaft 40B to the other end portion of the axle 37.

Therefore, in the drive wheel 103, the rotational force of the first input shaft 34A and the second input shaft 34B is transmitted to the first output shaft 40A and the second output shaft 40B via the first spur gear mechanism 13A and the second spur gear mechanism 13B, and is transmitted to the end portions of the axle 37 from the first output shaft 40A and the second output shaft 40B via the first bevel gear mechanism 15A and the second bevel gear mechanism 15B. In this example, in the drive wheel 103, it is possible to switch the rotation and steering of the wheel 16, by adjusting the rotational frequency of the first input shaft 34A and the second input shaft 34B. Therefore, in the drive wheel 103, because the bevel gear mechanisms 15A and 15B are arranged on each end portion of the axle 37, the transmission system of the rotational force to the wheel 16 is simplified. Hence, it is possible to simplify the structure and ensure a sufficient minimum ground clearance.

Moreover, in the drive wheel 103, the rotational axial center O5 of the wheel 16 along the vertical direction intersecting the axial center O2 of the axle 37 is arranged shifted in the horizontal direction orthogonal to the axial center O2 of the axle 37 with respect to the axial center O1 of the pivot shaft 35. Therefore, in the drive wheel 103, when the wheel 16 is not driven, it is possible to passively turn the wheel 16 by the external force applied from the horizontal direction. That is, not only the cart 100 can be driven automatically and steered automatically, but the operator can also manually drive and manually steer the cart 100.

As illustrated in FIG. 1 through FIG. 4, the drive wheel 103 of the present embodiment includes a turning position detection unit 50. The turning position detection unit 50 is provided on the main body 101. The turning position detection unit 50 includes a first spur gear 50a that rotates around the axial center O1 with the pivot shaft 35, a second spur gear 50b that meshes with the first spur gear 50a and that is driven to rotate around an axial center parallel to the axial center O1, and a detector 50c that detects the rotational position of the second spur gear 50b. Thus, when the first spur gear 50a rotates with the pivot shaft 35, and when the detector 50c detects the rotational position of the first spur gear 50a as the rotational position of the second spur gear 50b, it is possible to detect the rotational position of the pivot shaft 35, that is, the rotational position of the turning part 12 with respect to the main body 101. The detection signal of the detector 50c is input to the control device 105 of the cart 100. As a result, the control device 105 can control the turning of the drive wheel 103.

Figure 8:
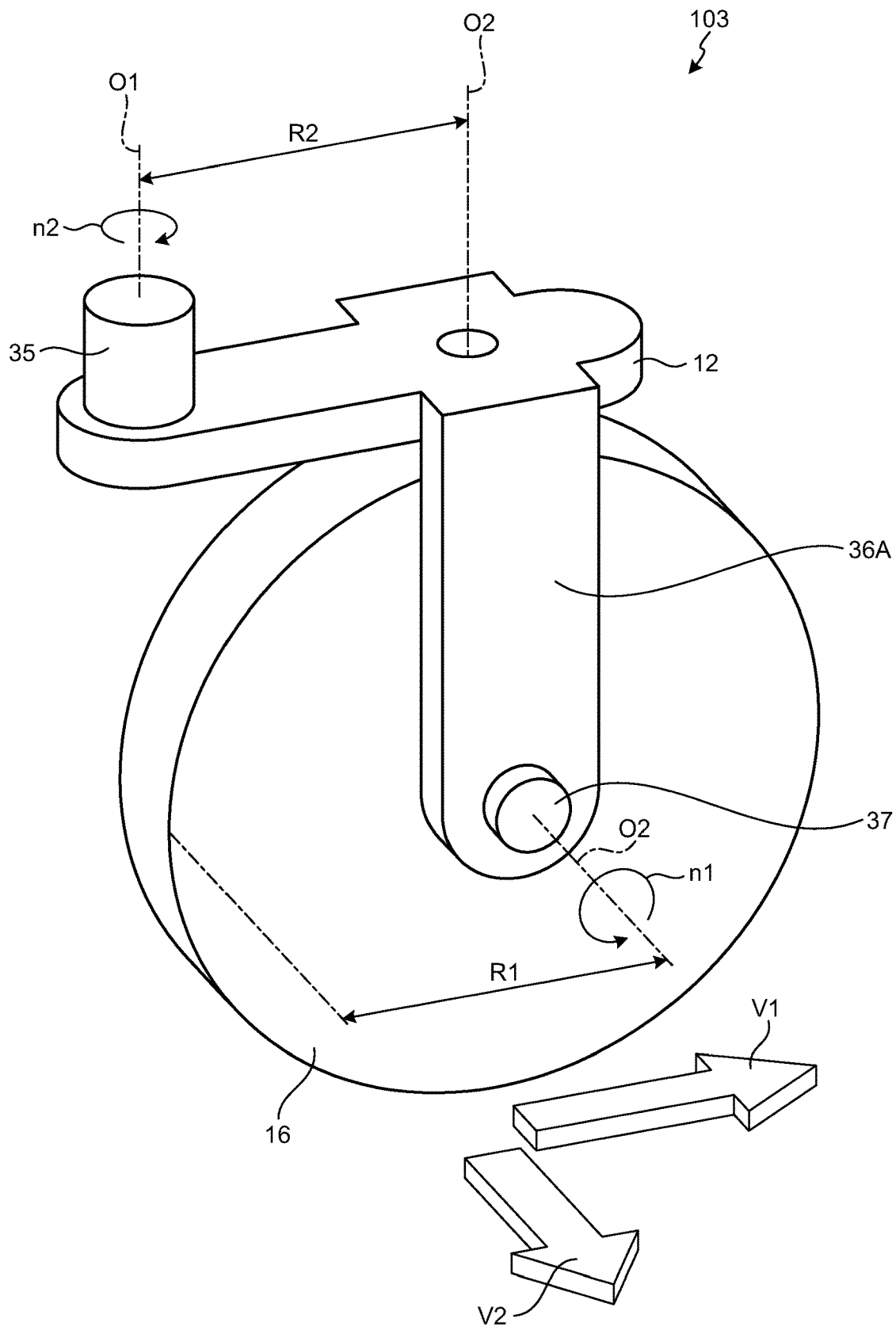
FIG. 8 is a perspective view for explaining a method for improving the driving efficiency of the drive wheel.
Figure 9:
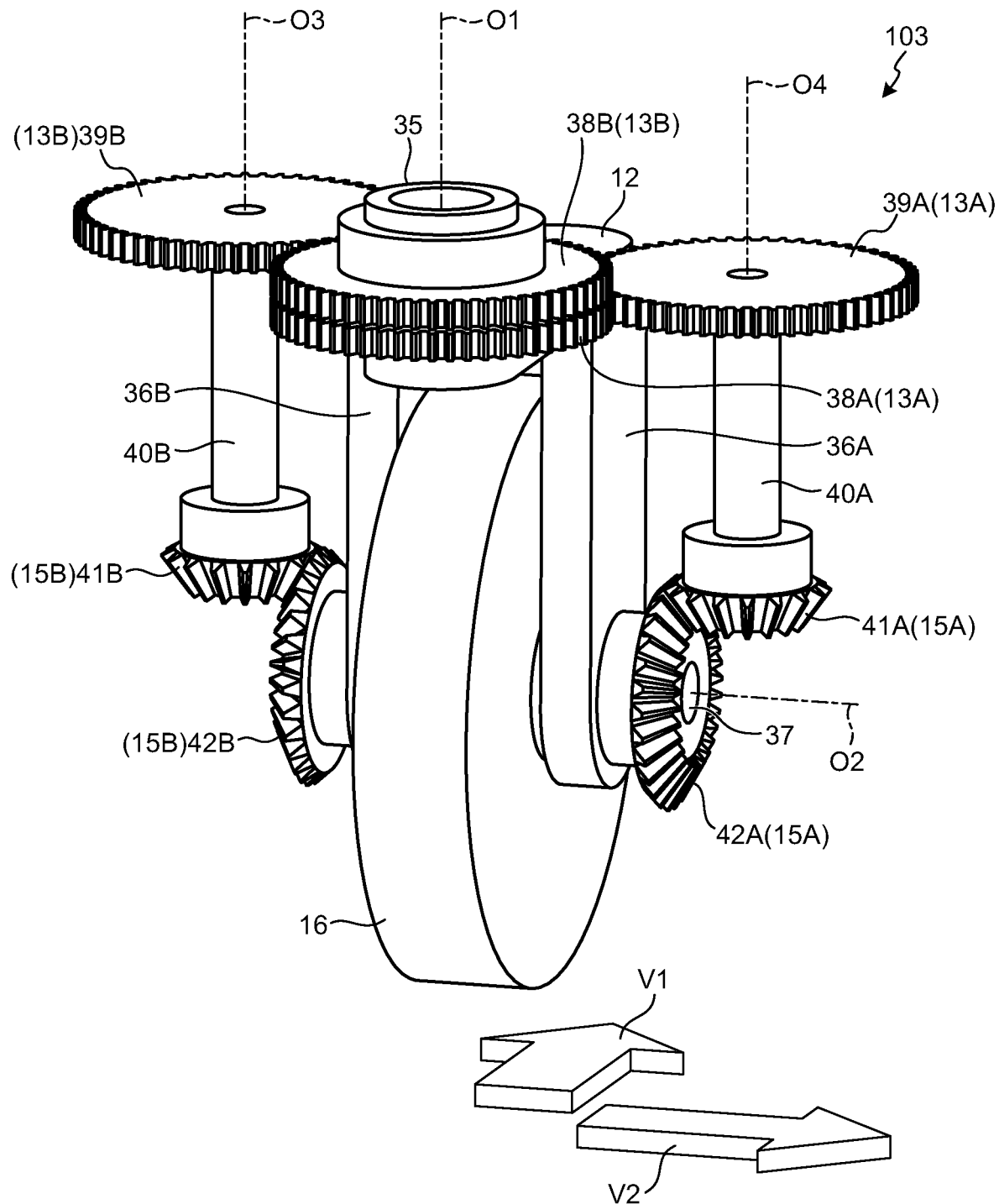
FIG. 9 is a perspective view for explaining the method for improving the driving efficiency of the drive wheel.

Hereinafter, a method for improving the driving efficiency of the drive wheel 103 described above will be explained. FIG. 8 is a perspective view for explaining a method for improving the driving efficiency of the drive wheel. FIG. 9 is a perspective view for explaining a method for improving the driving efficiency of the drive wheel.

In FIG. 8, R1 is the radius of the wheel 16 (referred to as a wheel radius) [mm]. R2 is distance between the axial center O1 of the pivot shaft 35 and the rotational axial center O5, and is the turning radius [mm] of the axle 37 corresponding to the shifted amount in the horizontal direction described above. n1 is the rotational frequency of the wheel 16 (referred to as wheel rotational frequency) [s]. n2 is the rotational frequency of the pivot shaft 35 (referred to as pivot rotational frequency) [s]. V1 is the rotational speed of the wheel 16 (referred to as wheel rotational speed) [m/s]. V2 is the rotational speed of the wheel 16 rolling on the floor surface G (see FIG. 14) while turning around the pivot shaft 35 (referred to as steering rotational speed) [m/s].

The relations of the wheel radius R1, the turning radius R2, the wheel rotational frequency n1, the pivot rotational frequency n2, the wheel rotational speed V1, and the steering rotational speed V2 are expressed by the following formulae (1) and (2).

$$V1 = 2\pi \times R1 \times n1 \tag{1}$$

$$V2 = 2\pi \times R2 \times 2 \tag{2}$$

Then, when V1=V2 is satisfied, the differential rotation between the first output shaft 40A and the second output shaft 40B can move the wheel 16 efficiently. Hence, the relation between the axle 37 and the pivot shaft 35 can be expressed by the following formula (3).

$$R1 \times n1 = R2 \times n2 \tag{3}$$

Then, when the pivot rotational frequency n2 is a constant, the wheel rotational frequency n1 is expressed by the following formula (4).

$$n1 = n2(R2/R1) \tag{4}$$

In other words, it is clear that it is efficient to reduce the wheel rotational frequency n1 by the multiple of the ratio between the wheel radius R1 and the turning radius R2. Accordingly, the reduction ratio of the wheel 16 with respect to the input from the pivot shaft 35 is expressed by the following formula (5).

$$R2/R1 \tag{5}$$

Thus, the gear ratio of the meshing gears is set to the reduction ratio of the formula (5) or a value close to the reduction ratio. Hence, the operation of moving the wheel 16 efficiently is made possible by the differential method.

More specifically, in the drive wheel 103, it is assumed that the ratio R2/R1 between the wheel radius R1 and the turning radius R2 illustrated in FIG. 8 is ⅔. Then, in the drive wheel 103 in FIG. 9, the numbers of teeth of the first drive spur gear 38A and the first driven spur gear 39A in the first spur gear mechanism 13A are set to the same number (for example, 30), and the numbers of teeth of the second drive spur gear 38B and the second driven spur gear 39B in the second spur gear mechanism 13B are set to the same number (for example, 30). In this case, in the drive wheel 103, to set the number of teeth to ⅔ or a value close to ⅔, for example, the number of teeth of the first drive bevel gear 41A in the first bevel gear mechanism 15A is set to 20, and for example, the number of teeth of the first driven bevel gear 42A is set to 30. Also, for example, the number of teeth of the second drive bevel gear 41B in the second bevel gear mechanism 15B is set to 20, and for example, the number of teeth of the second driven bevel gear 42B is set to 30. As a result, in the drive wheel 103, the operation of moving the wheel 16 efficiently is made possible by the differential method. The number of teeth of the first drive bevel gear 41A in the first bevel gear mechanism 15A and the number of teeth of the second drive bevel gear 41B in the second bevel gear mechanism 15B are preferably the ratio R2/R1 between the wheel radius R1 and the turning radius R2 as described above. However, the number of teeth may also be a value close to R2/R1 ((R2/R1)±10%).

Moreover, in the drive wheel 103, it is assumed that the ratio R2/R1 between the wheel radius R1 and the turning radius R2 illustrated in FIG. 8 is ⅔. Then, in the drive wheel 103 in FIG. 9, the numbers of teeth of the first drive bevel gear 41A and the first driven bevel gear 42A in the first bevel gear mechanism 15A are set to the same number (for example, 30), and the numbers of teeth of the second drive bevel gear 41B and the second driven bevel gear 42B in the second bevel gear mechanism 15B are set to the same number (for example, 30). In this case, in the drive wheel 103, to set the number of teeth to ⅔ or a value close to ⅔, for example, the number of teeth of the first drive spur gear 38A in the first spur gear mechanism 13A is set to 78, and for example, the number of teeth of the first driven spur gear 39A is set to 52. Also, for example, the number of teeth of the second drive spur gear 38B in the second spur gear mechanism 13B is set to 78, and for example, the number of teeth of the second driven spur gear 39B is set to 52. As a result, in the drive wheel 103, the operation of moving the wheel 16 efficiently is made possible by the differential method. The number of teeth of the first drive spur gear 38A in the first spur gear mechanism 13A and the number of teeth of the second drive spur gear 38B in the second spur gear mechanism 13B are preferably the ratio R2/R1 between the wheel radius R1 and the turning radius R2 as described above. However, the number of teeth may also be a value close to R2/R1 ((R2/R1)±10%).

Figure 10:
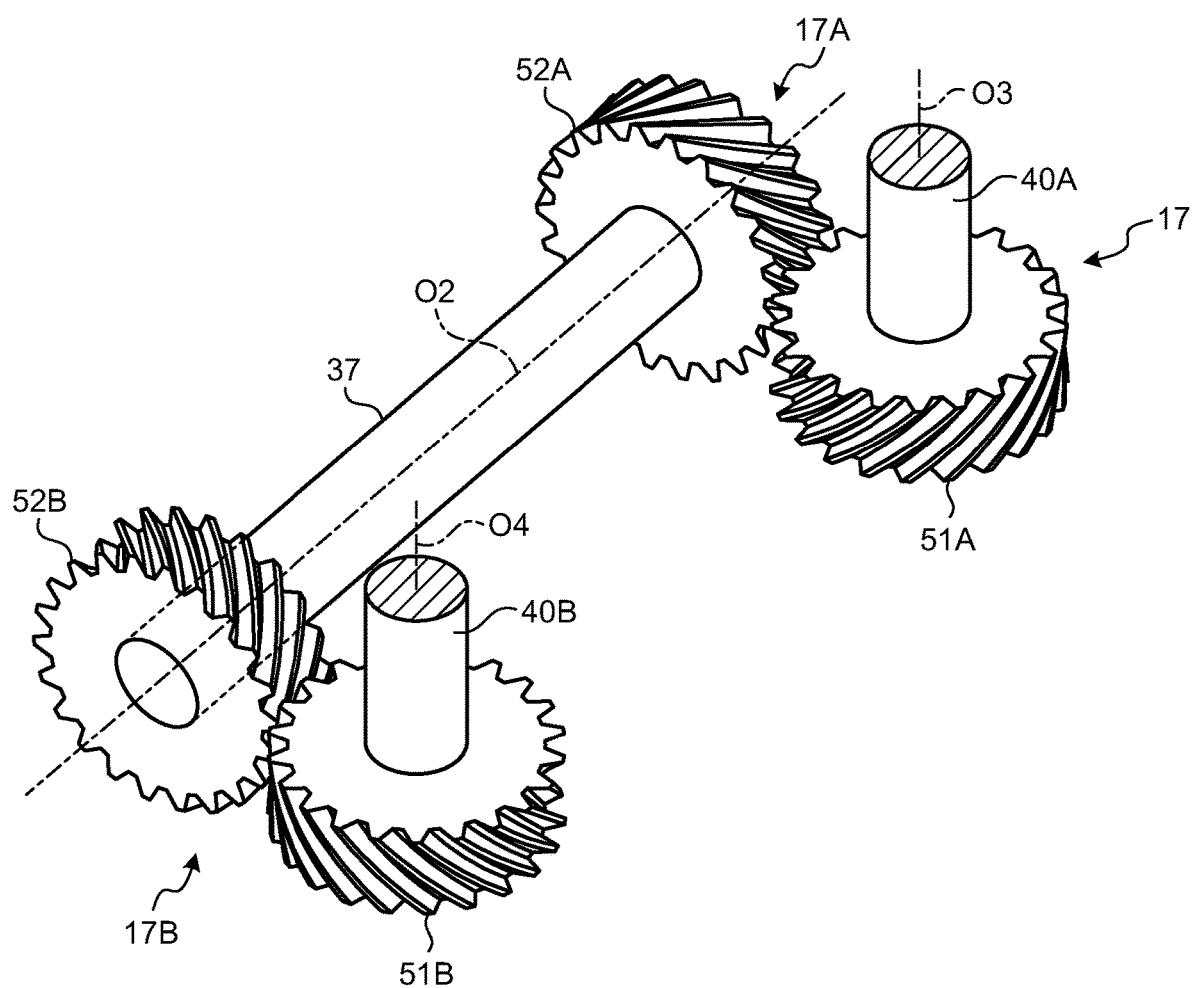
FIG. 10 is a partial perspective view illustrating an example of a power conversion mechanism.
Figure 11:
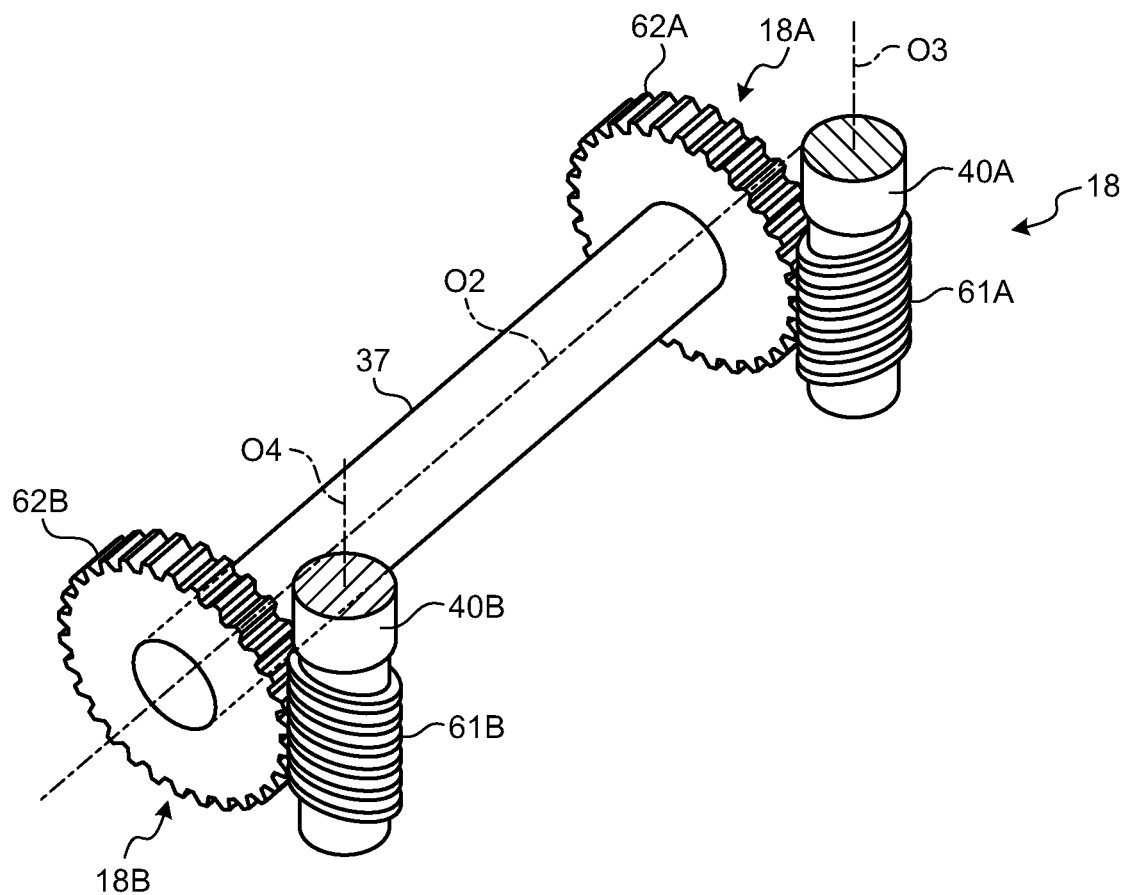
FIG. 11 is a partial perspective view illustrating an example of the power conversion mechanism.
Figure 12:
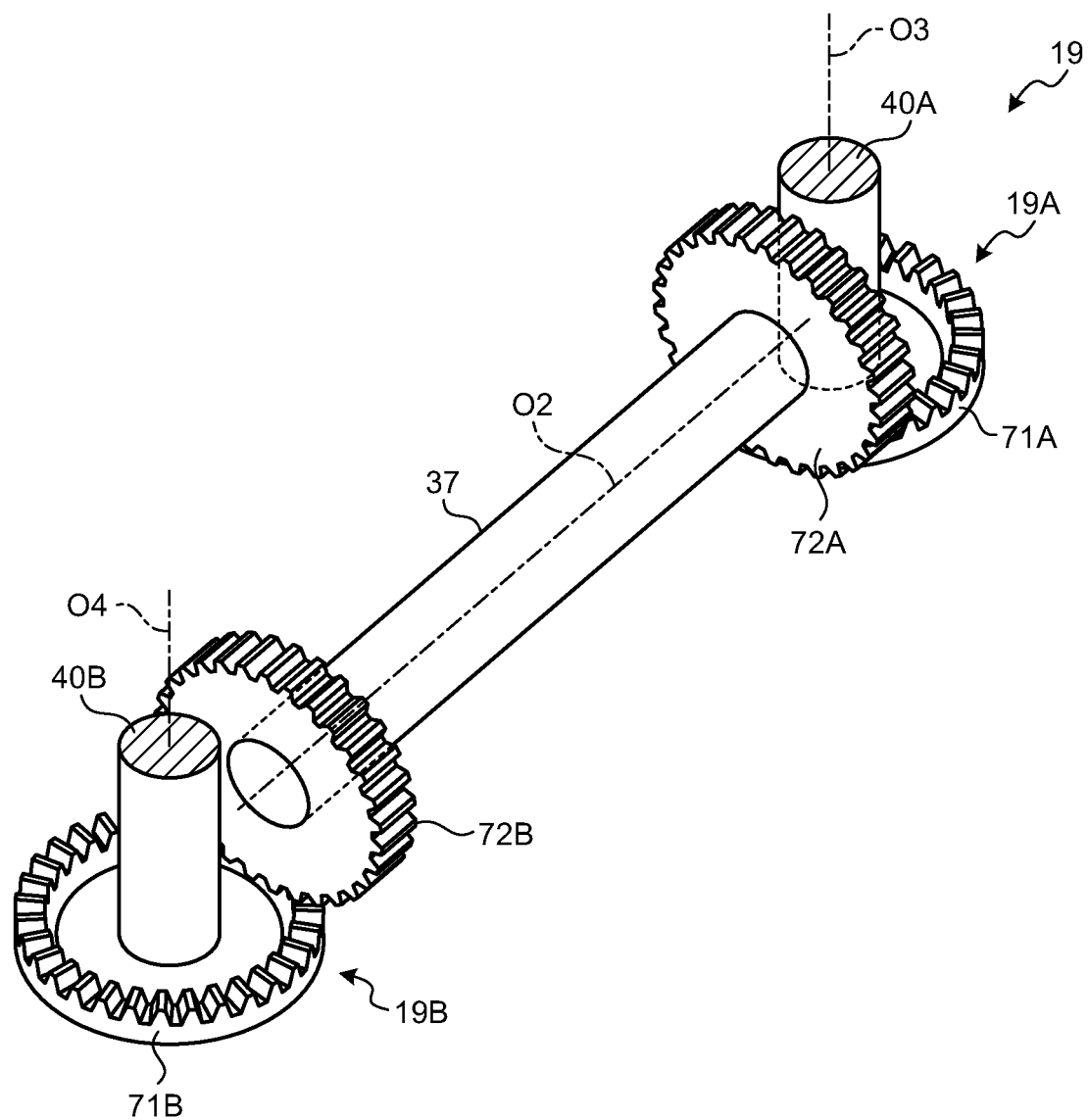
FIG. 12 is a partial perspective view illustrating an example of the power conversion mechanism.
Figure 13:
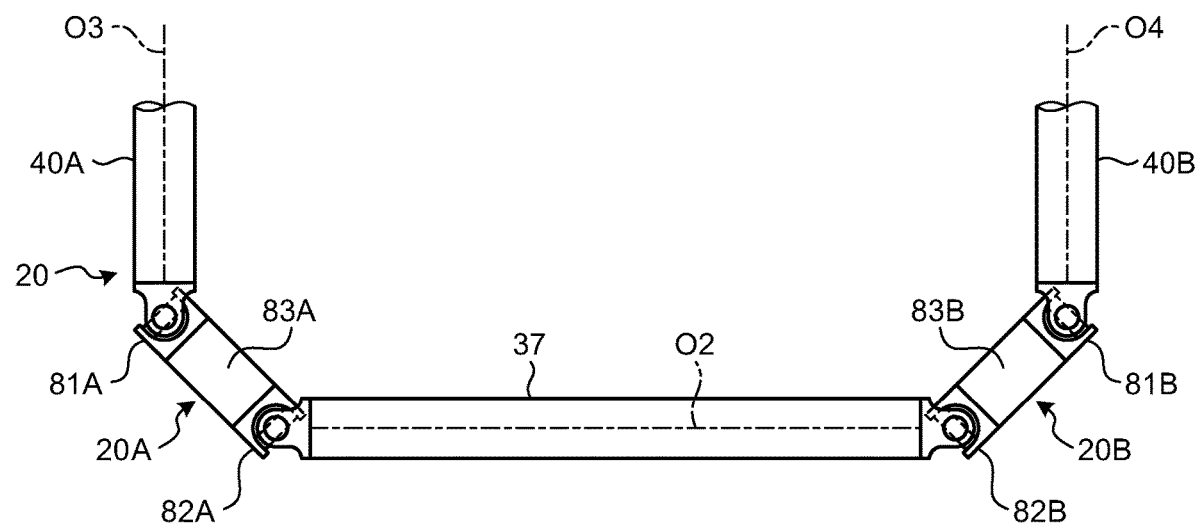
FIG. 13 is a partial front view illustrating an example of the power conversion mechanism.

FIG. 10 is a partial perspective view illustrating an example of a power conversion mechanism. FIG. 11 is a partial perspective view illustrating an example of the power conversion mechanism. FIG. 12 is a partial perspective view illustrating an example of the power conversion mechanism. FIG. 13 is a partial front view illustrating an example of the power conversion mechanism.

As described above, the power conversion mechanism is the bevel gear mechanism 15 including the first bevel gear mechanism 15A and the second bevel gear mechanism 15B. However, it is not limited thereto.

FIG. 10 illustrates a helical gear mechanism 17 as an example of the power conversion mechanism used in place of the bevel gear mechanism 15. The helical gear mechanism 17 transmits the rotational force of the output unit 14 to the wheel 16. The helical gear mechanism 17 includes a first helical gear mechanism 17A serving as a first power conversion mechanism and a second helical gear mechanism 17B serving as a second power conversion mechanism. The first helical gear mechanism 17A includes a first drive helical gear 51A fixed to the lower portion of the first output shaft 40A, and a first driven helical gear 52A that is fixed to one end portion in the axial center O2 direction of the axle 37 provided on the wheel 16, and that meshes with the first drive helical gear 51A. The second helical gear mechanism 17B includes a second drive helical gear 51B fixed to the lower portion of the second output shaft 40B, and a second driven helical gear 52B that is fixed to the other end portion in the axial center O2 direction of the axle 37 and that meshes with the second drive helical gear 51B.

Then, as described above, the rotational force of the first input shaft 34A and the second input shaft 34B is transmitted to the first output shaft 40A and the second output shaft 40B via the first spur gear mechanism 13A and the second spur gear mechanism 13B, and is transmitted to the end portions of the axle 37 from the first output shaft 40A and the second output shaft 40B via the first helical gear mechanism 17A and the second helical gear mechanism 17B. In this example, it is possible to switch the rotation and steering of the wheel 16, by adjusting the rotational frequency of the first input shaft 34A and the second input shaft 34B. In such a configuration of the drive wheel 103, the numbers of teeth of the first drive helical gear 51A and the first driven helical gear 52A, and the numbers of teeth of the second drive helical gear 51B and the second driven helical gear 52B are set to the ratio R2/R1 of the wheel radius R1 and the turning radius R2 illustrated in FIG. 8, or a value close to R2/R1 ((R2/R1)±10%). Alternatively, in the drive wheel 103, while setting the numbers of teeth to the same number as described above, the numbers of teeth of the first drive spur gear 38A and the first driven spur gear 39A in the first spur gear mechanism 13A, and the numbers of teeth of the second drive spur gear 38B and the second driven spur gear 39B in the second spur gear mechanism 13B are set to the ratio R2/R1 of the wheel radius R1 and the turning radius R2 illustrated in FIG. 8, or a value close to R2/R1 ((R2/R1) ±10%) as described above. As a result, in the drive wheel 103, the operation of moving the wheel 16 efficiently is made possible by the differential method.

FIG. 11 illustrates a worm gear mechanism 18 as an example of the power conversion mechanism used in place of the bevel gear mechanism 15. The worm gear mechanism 18 transmits the rotational force of the output unit 14 to the wheel 16. The worm gear mechanism 18 includes a first worm gear mechanism 18A serving as a first power conversion mechanism and a second worm gear mechanism 18B serving as a second power conversion mechanism. The first worm gear mechanism 18A includes a first worm 61A fixed to the lower portion of the first output shaft 40A, and a first worm wheel 62A that is fixed to one end portion in the axial center O2 direction of the axle 37 provided on the wheel 16, and that meshes with the first worm 61A. The second worm gear mechanism 18B includes a second worm 61B fixed to the lower portion of the second output shaft 40B, and a second worm wheel 62B that is fixed to the other end portion in the axial center O2 direction of the axle 37 and that meshes with the second worm 61B.

Then, as described above, the rotational force of the first input shaft 34A and the second input shaft 34B is transmitted to the first output shaft 40A and the second output shaft 40B via the first spur gear mechanism 13A and the second spur gear mechanism 13B, and is transmitted to the end portions of the axle 37 from the first output shaft 40A and the second output shaft 40B via the first worm gear mechanism 18A and the second worm gear mechanism 18B. In this example, it is possible to switch the rotation and steering of the wheel 16, by adjusting the rotational frequency of the first input shaft 34A and the second input shaft 34B. In such a configuration of the drive wheel 103, the numbers of teeth of the first worm 61A and the first worm wheel 62A, and the numbers of teeth of the second worm 61B and the second worm wheel 62B are set to the ratio R2/R1 of the wheel radius R1 and the turning radius R2 illustrated in FIG. 8, or a value close to R2/R1 ((R2/R1)±10%). Alternatively, in the drive wheel 103, while setting the numbers of teeth to the same number as described above, the numbers of teeth of the first drive spur gear 38A and the first driven spur gear 39A in the first spur gear mechanism 13A, and the numbers of teeth of the second drive spur gear 38B and the second driven spur gear 39B in the second spur gear mechanism 13B are set to the ratio R2/R1 of the wheel radius R1 and the turning radius R2 illustrated in FIG. 8, or a value close to R2/R1 ((R2/R1) ±10%) as described above. As a result, in the drive wheel 103, the operation of moving the wheel 16 efficiently is made possible by the differential method.

The first worm gear mechanism 18A may also be configured such that the first worm wheel 62A is fixed to the lower portion of the first output shaft 40A, and the first worm 61A is fixed to one end portion in the axial center O2 direction of the axle 37. Moreover, the second worm gear mechanism 18B may also be configured such that the second worm wheel 62B is fixed to the lower portion of the second output shaft 40B, and the second worm 61B is fixed to the other end portion in the axial center O2 direction of the axle 37.

FIG. 12 illustrates a crown gear mechanism 19 as an example of the power conversion mechanism used in place of the bevel gear mechanism 15. The crown gear mechanism 19 transmits the rotational force of the output unit 14 to the wheel 16. The crown gear mechanism 19 includes a first crown gear mechanism 19A serving as a first power conversion mechanism, and a second crown gear mechanism 19B serving as a second power conversion mechanism. The first crown gear mechanism 19A includes a first crown gear 71A fixed to the lower portion of the first output shaft 40A, and a first spur gear 72A that is fixed to one end portion in the axial center O2 direction of the axle 37 provided on the wheel 16 and that meshes with the first crown gear 71A. The second crown gear mechanism 19B includes a second crown gear 71B fixed to the lower portion of the second output shaft 40B, and a second spur gear 72B that is fixed to the other end portion in the axial center O2 direction of the axle 37 and that meshes with the second crown gear 71B.

Then, as described above, the rotational force of the first input shaft 34A and the second input shaft 34B is transmitted to the first output shaft 40A and the second output shaft 40B via the first spur gear mechanism 13A and the second spur gear mechanism 13B, and is transmitted to the end portions of the axle 37 from the first output shaft 40A and the second output shaft 40B via the first crown gear mechanism 19A and the second crown gear mechanism 19B. In this example, it is possible to switch the rotation and steering of the wheel 16, by adjusting the rotational frequency of the first input shaft 34A and the second input shaft 34B. In such a configuration of the drive wheel 103, the numbers of teeth of the first crown gear 71A and the first spur gear 72A, and the numbers of teeth of the second crown gear 71B and the second spur gear 72B are set to the ratio R2/R1 of the wheel radius R1 and the turning radius R2 illustrated in FIG. 8, or a value close to R2/R1 ((R2/R1)±10%). Alternatively, in the drive wheel 103, while setting the numbers of teeth to the same number as described above, the numbers of teeth of the first drive spur gear 38A and the first driven spur gear 39A in the first spur gear mechanism 13A, and the numbers of teeth of the second drive spur gear 38B and the second driven spur gear 39B in the second spur gear mechanism 13B are set to the ratio R2/R1 of the wheel radius R1 and the turning radius R2 illustrated in FIG. 8, or a value close to R2/R1 ((R2/R1)±10%) as described above. As a result, in the drive wheel 103, the operation of moving the wheel 16 efficiently is made possible by the differential method.

The first crown gear mechanism 19A may also be configured such that the first spur gear 72A is fixed to the lower portion of the first output shaft 40A, and the first crown gear 71A is fixed to one end portion in the axial center O2 direction of the axle 37. Moreover, the second crown gear mechanism 19B may also be configured such that the second spur gear 72B is fixed to the lower portion of the second output shaft 40B, and the second crown gear 71B is fixed to the other end portion in the axial center O2 direction of the axle 37.

FIG. 13 illustrates a universal joint mechanism (universal joint mechanism) 20 as an example of the power conversion mechanism used in place of the bevel gear mechanism 15. The universal joint mechanism 20 transmits the rotational force of the output unit 14 to the wheel 16. The universal joint mechanism 20 includes a first universal joint mechanism 20A serving as a first power conversion mechanism and a second universal joint mechanism 20B serving as a second power conversion mechanism. The first universal joint mechanism 20A includes a first drive joint 81A fixed to the lower end of the first output shaft 40A, a first driven joint 82A fixed to one end in the axial center O2 direction of the axle 37 provided on the wheel 16, and a first connection part 83A that connects the first drive joint 81A and the first driven joint 82A. The second universal joint mechanism 20B includes a second drive joint 81B fixed to the lower end of the second output shaft 40B, a second driven joint 82B fixed to the other end in the axial center O2 direction of the axle 37, and a second connection part 83B that connects the second drive joint 81B and the second driven joint 82B. Although not illustrated in the drawing, in the first universal joint mechanism 20A, one end of the first connection part 83A is fixed to the lower end of the first output shaft 40A, the other end of the first connection part 83A is fixed to one end in the axial center O2 direction of the axle 37, and a single or a plurality of joints corresponding to the first drive joint 81A and the first driven joint 82A are provided in the intermediate portion. Similarly, although not illustrated in the drawing, in the second universal joint mechanism 20B, one end of the second connection part 83B is fixed to the lower end of the second output shaft 40B, the other end of the second connection part 83B is fixed to the other end in the axial center O2 direction of the axle 37, and a single or a plurality of joints corresponding to the second drive joint 81B and the second driven joint 82B are provided in the intermediate portion.

Then, as described above, the rotational force of the first input shaft 34A and the second input shaft 34B is transmitted to the first output shaft 40A and the second output shaft 40B via the first spur gear mechanism 13A and the second spur gear mechanism 13B, and is transmitted to the end portions of the axle 37 from the first output shaft 40A and the second output shaft 40B via the first universal joint mechanism 20A and the second universal joint mechanism 20B. In this example, it is possible to switch the rotation and steering of the wheel 16, by adjusting the rotational frequency of the first input shaft 34A and the second input shaft 34B. In this case, in the drive wheel 103, as described above, the numbers of teeth of the first drive spur gear 38A and the first driven spur gear 39A in the first spur gear mechanism 13A, and the numbers of teeth of the second drive spur gear 38B and the second driven spur gear 39B in the second spur gear mechanism 13B are set to the ratio R2/R1 of the wheel radius R1 and the turning radius R2 illustrated in FIG. 8, or a value close to R2/R1 ((R2/R1)±10%). As a result, in the drive wheel 103, the operation of moving the wheel 16 efficiently is made possible by the differential method.

In the drive wheel 103 described above, the first output shaft 40A and the second output shaft 40B are arranged on both sides in the axial center O2 direction of the axle 37 with respect to the wheel 16. Therefore, in the drive wheel 103, the rotational force is input from both sides in the axial center O2 direction of the axle 37. Hence, it is possible to simplify the differential mechanism for steering the wheel 16.

Moreover, in the drive wheel 103, the first bevel gear mechanism 15A and the second bevel gear mechanism 15B are arranged on both sides in the axial center O2 direction of the axle 37 with respect to the wheel 16. Thus, in the drive wheel 103, the rotational force is input from both sides in the axial center O2 direction of the axle 37. Hence, it is possible to simplify the differential mechanism for steering the wheel 16.

Moreover, in the drive wheel 103, the first bevel gear mechanism 15A and the second bevel gear mechanism 15B are arranged on the upper side in the vertical direction intersecting the axial center O2 direction of the axle 37. Thus, in the drive wheel 103, there is no need to arrange the bevel gear mechanisms 15A and 15B on both sides in the axial center O2 direction of the axle 37. Hence, it is possible to reduce the size of the differential mechanism.

Moreover, in the drive wheel 103, the first support member 36A and the second support member 36B are connected to the pivot shaft 35 on both sides in the axial center O2 direction of the axle 37 with respect to the wheel 16, and the end portions in the axial center O2 direction of the axle 37 are rotatably supported by the first support member 36A and the second support member 36B. Therefore, in the drive wheel 103, it is possible to simplify the differential mechanism for steering the wheel 16.

In the drive wheel 103, the pivot shaft 35 is coaxially disposed with the first input shaft 34A and the second input shaft 34B. Therefore, it is possible to reduce the size and simplify the structure of the drive wheel 103.

Moreover, the cart 100 described above includes the drive wheel 103 and the main body 101 to which the drive wheel 103 is fitted. Therefore, it is possible to simplify the structure, and ensure a sufficient minimum ground clearance.

Incidentally, in the drive wheel 103, the axial center directions of the first output shaft 40A and the axle 37 are different from each other by 90 degrees. Therefore, the first power conversion mechanism (first bevel gear mechanism 15A, first helical gear mechanism 17A, first worm gear mechanism 18A, first crown gear mechanism 19A, and first universal joint mechanism 20A) that transmits the rotational force of the first output shaft 40A to one end portion of the axle 37, transmits the rotational force of the first output shaft 40A to one end portion of the axle 37 the axial center direction of which is different from that of the first output shaft 40A. Moreover, the axial center directions of the second output shaft 40B and the axle 37 are different from each other by 90 degrees. Therefore, the second power conversion mechanism (second bevel gear mechanism 15B, second helical gear mechanism 17B, second worm gear mechanism 18B, second crown gear mechanism 19B, and second universal joint mechanism 20B) that transmits the rotational force of the second output shaft 40B to the other end portion of the axle 37, transmits the rotational force of the second output shaft 40B to the other end portion of the axle 37 the axial center direction of which is different from that of the second output shaft 40B.

Moreover, in the drive wheel 103, as described above, the input unit 11 includes the dual shaft integrated motor 30, and two rotational forces are supplied to the pivot center of the wheel 16. Hence, the first input shaft 34A, the second input shaft 34B, and the pivot shaft 35 are coaxially and rotatably disposed along the axial center O1. Furthermore, in the drive wheel 103, the rotational force of the first input shaft 34A and the second input shaft 34B is transmitted to the first output shaft 40A and the second output shaft 40B via the first spur gear mechanism 13A and the second spur gear mechanism 13B. Hence, the axial center O3 of the first output shaft 40A and the axial center O4 of the second output shaft 40B are in parallel with the axial center O1. Still furthermore, the axle 37 of the wheel 16 extends along the axial center O2 direction orthogonal to the axial center O1 direction. Hence, to transmit the rotational force of the first output shaft 40A and the second output shaft 40B to the axle 37 the axial center direction of which is different by 90 degrees, the first power conversion mechanism (first bevel gear mechanism 15A, first helical gear mechanism 17A, first worm gear mechanism 18A, first crown gear mechanism 19A, and first universal joint mechanism 20A) and the second power conversion mechanism (second bevel gear mechanism 15B, second helical gear mechanism 17B, second worm gear mechanism 18B, second crown gear mechanism 19B, and second universal joint mechanism 20B) are provided.

The configuration of the power conversion mechanism is not limited to what has been described above, and it is sufficient that the rotational force of the output shafts 40A and 40B is transmitted to the axle 37 the axial center direction of which is different from that of the output shafts 40A and 40B.

Modification

Figure 15:
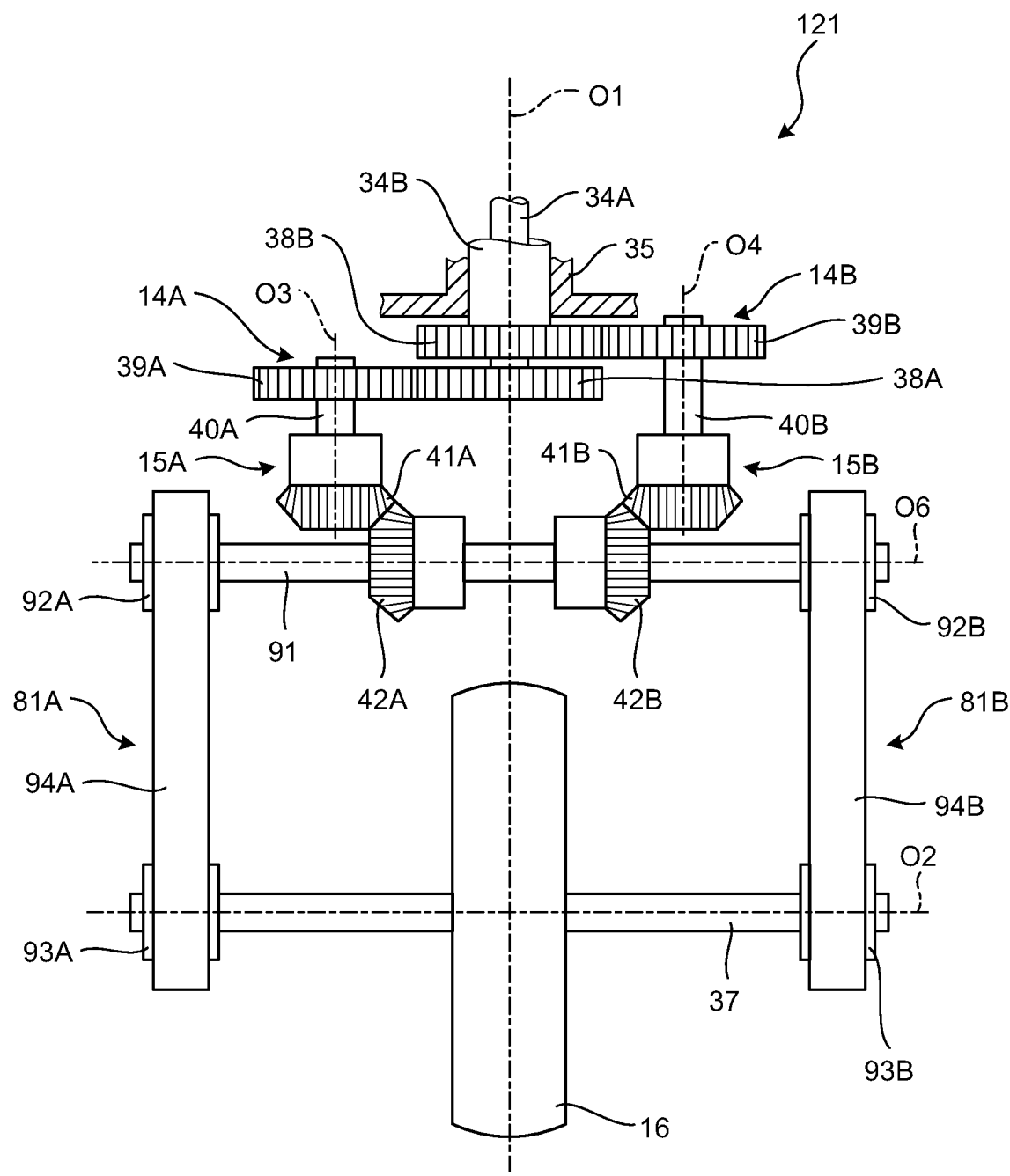
FIG. 15 is a front view of an essential part illustrating a modification of the drive wheel.
Figure 16:
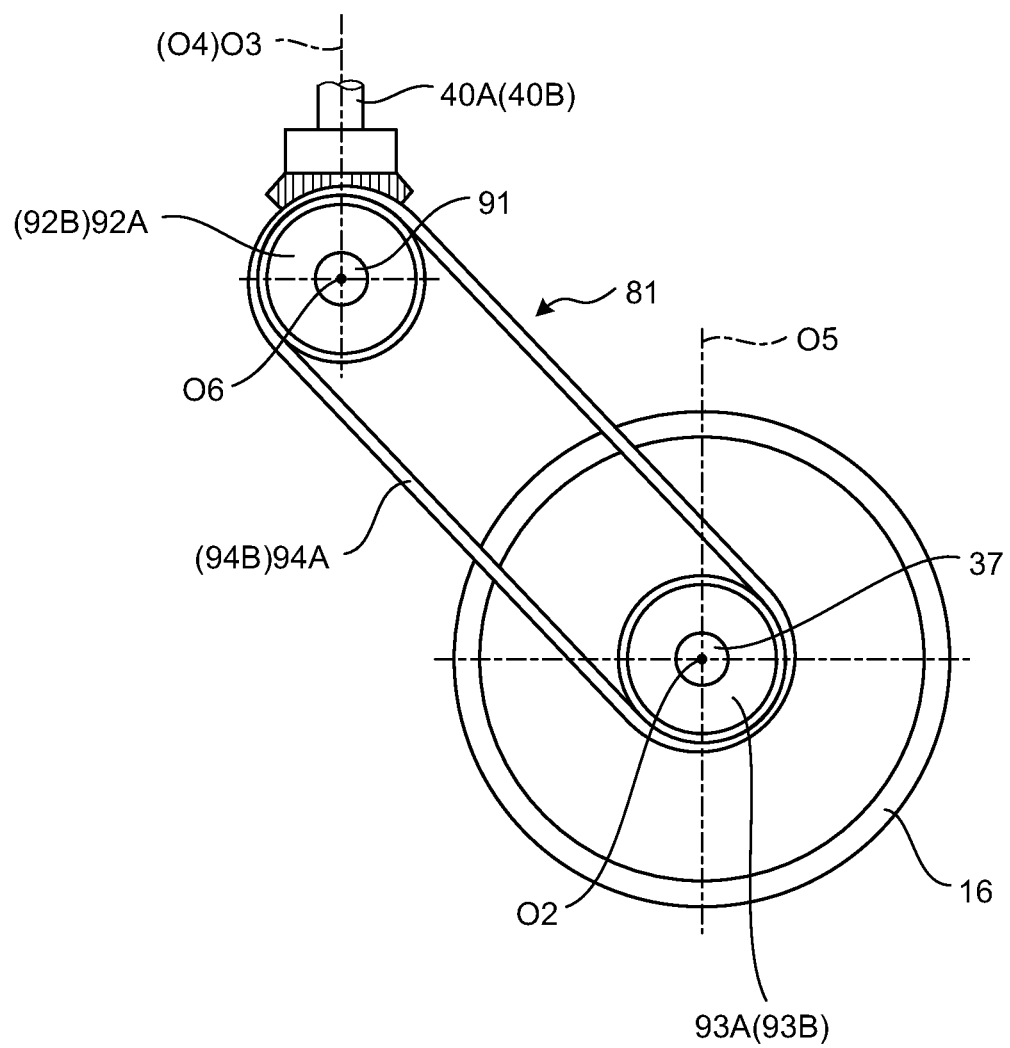
FIG. 16 is a side view of an essential part illustrating a modification of the drive wheel.

FIG. 15 is a front view of an essential part illustrating a modification of the drive wheel. FIG. 16 is a side view of an essential part illustrating a modification of the drive wheel. The same reference numerals are given to members having the same functions as those of the drive wheel 103 described above, and the detailed description thereof will be omitted.

As illustrated in FIG. 15 and FIG. 16, a drive wheel 121 includes the input unit 11, the turning part 12, the spur gear mechanism 13, the output unit 14 (14A, 14B), the bevel gear mechanism 15 (15A, 15B) serving as a power conversion mechanism, a power transmission mechanism 81, and the wheel 16. In this example, as illustrated in FIG. 1 and FIG. 4, the input unit 11, the turning part 12, and the spur gear mechanism 13 are the same as those in the drive wheel 103 described above.

The first input shaft 34A, the second input shaft 34B, and the pivot shaft 35 are coaxially and rotatably disposed along the axial center O1. The first drive spur gear 38A is fixed to the lower end portion of the first input shaft 34A, and the second drive spur gear 38B is fixed to the lower end portion of the second input shaft 34B. The first drive spur gear 38A meshes with the first driven spur gear 39A, and the second drive spur gear 38B meshes with the second driven spur gear 39B. The second drive spur gear 38B and the first drive spur gear 38A are stacked vertically and rotate around the axial center O1. The first driven spur gear 39A is fixed to the upper portion of the first output shaft 40A. The first output shaft 40A is rotatably supported by the pivot shaft 35 around the axial center O3. The second driven spur gear 39B is fixed to the upper portion of the second output shaft 40B, and the second output shaft 40B is rotatably supported by the pivot shaft 35 around the axial center O4.

A first drive bevel gear 41A is fixed to the lower portion of the first output shaft 40A, and a second drive bevel gear 41B is fixed to the lower portion of the second output shaft 40B. The first driven bevel gear 42A that meshes with the first drive bevel gear 41A, and the second driven bevel gear 42B that meshes with the second drive bevel gear 41B are fixed to a connection shaft 91. The connection shaft 91 is orthogonal to the axial center O1, and parallel to the axial center O2. A first power transmission mechanism 81A is provided between the first bevel gear mechanism 15A and one end portion of the axle 37, and a second power transmission mechanism 81B is provided between the second bevel gear mechanism 15B and the other end portion of the axle 37.

The bevel gear mechanism 15 includes the first bevel gear mechanism 15A serving as a first power conversion mechanism and the second bevel gear mechanism 15B serving as a second power conversion mechanism. The first bevel gear mechanism 15A includes the first drive bevel gear 41A and the first driven bevel gear 42A. The second bevel gear mechanism 15B includes the second drive bevel gear 41B and the second driven bevel gear 42B. As described in the first embodiment, for the first power conversion mechanism, the first helical gear mechanism 17A, the first worm gear mechanism 18A, the first crown gear mechanism 19A, and the first universal joint mechanism 20A may also be applied in place of the first bevel gear mechanism 15A. For the second power conversion mechanism, the second helical gear mechanism 17B, the second worm gear mechanism 18B, the second crown gear mechanism 19B, and the second universal joint mechanism 20B may also be applied in place of the second bevel gear mechanism 15B.

That is, a first drive pulley 92A is fixed to one end portion of the connection shaft 91 in an axial center O6 direction, and a second drive pulley 92B is fixed to the other end portion in the axial center O6 direction. Moreover, a first driven pulley 93A is fixed to one end portion of the axle 37 in the axial center O2 direction, and a second driven pulley 93B is fixed to the other end portion in the axial center O2 direction. Then, an endless first drive belt 94A is wound between the first drive pulley 92A and the first driven pulley 93A, and an endless second drive belt 94B is wound between the second drive pulley 92B and the second driven pulley 93B. In this example, the first power transmission mechanism 81A includes the first drive pulley 92A, the first driven pulley 93A, and the first drive belt 94A, and the second power transmission mechanism 81B includes the second drive pulley 92B, the second driven pulley 93B, and the second drive belt 94B.

Therefore, when the first input shaft 34A is rotated, the first drive spur gear 38A is rotated, and rotates the first driven spur gear 39A. When the first driven spur gear 39A is rotated, the first drive bevel gear 41A rotates with the first output shaft 40A. Then, the first driven bevel gear 42A that meshes with the first drive bevel gear 41A is rotated, and causes the connection shaft 91 to rotate. The rotational force of the connection shaft 91 is transmitted to the axle 37 via the first drive pulley 92A, the first drive belt 94A, and the first driven pulley 93A, and causes the axle 37 to rotate. On the other hand, when the second input shaft 34B is rotated in the opposite direction of the first input shaft 34A, the second drive spur gear 38B is rotated, and rotates the second driven spur gear 39B. When the second driven spur gear 39B is rotated, the second drive bevel gear 41B rotates with the second output shaft 40B. Then, the second driven bevel gear 42B that meshes with the second drive bevel gear 41B is rotated, and causes the connection shaft 91 to rotate. The rotational force of the connection shaft 91 is transmitted to the axle 37 via the second drive pulley 92B, the second drive belt 94B, and the second driven pulley 93B, and causes the axle 37 to rotate.

Although not illustrated in the drawing, in the drive wheel 121, the first drive pulley 92A and the first driven pulley 93A may be used as sprockets and the first drive belt 94A may be used as a chain, and the second drive pulley 92B and the second driven pulley 93B may be used as sprockets and the second drive belt 94B may be used as a chain. Moreover, although not illustrated in the drawing, in the drive wheel 121, the first drive pulley 92A and the first driven pulley 93A may also be used as spur gears, and a spur gear that meshes with the spur gears may be used in place of the first drive belt 94A. In addition, the second drive pulley 92B and the second driven pulley 93B may also be used as spur gears, and a spur gear that meshes with the spur gears may be used in place of the second drive belt 94B. Furthermore, although not illustrated in the drawing, in the drive wheel 121, a propeller shaft both end portions of which have bevel gears meshing with the other bevel gears, may be provided between the bevel gear provided on one end portion of the axle 37 and the first driven bevel gear 42A. In addition, a propeller shaft both end portions of which have bevel gears meshing with the other bevel gears, may be provided between the bevel gear provided on the other end portion of the axle 37 and the second driven bevel gear 42B.

The drive wheel 121 can rotate and steer the wheel 16 by rotating the first input shaft 34A and the second input shaft 34B by the motor 30 via the first rotating cylinder 32A and the second rotating cylinder 32B. That is, the wheel 16 can be rotated without steering, by rotating the first input shaft 34A and rotating the second input shaft 34B in the opposite direction of the first input shaft 34A, and by setting the rotational frequencies (rotational speed) of the first input shaft 34A and the second input shaft 34B to be the same. In this process, by setting the rotational frequency (rotational speed) of the first input shaft 34A and the second input shaft 34B different from each other, it is possible to steer the wheel 16 in a rotating state or in a stopped state.

Because the operation of rotating and steering the drive wheel 121 is substantially the same as that of the drive wheel 103 described above, the description thereof will be omitted.

In this manner, in the drive wheel 121, the first power transmission mechanism 81A is provided between the first bevel gear mechanism 15A and one end portion of the axle 37, and the second power transmission mechanism 81B is provided between the second bevel gear mechanism 15B and the other end portion of the axle 37. Thus, the drive wheel 121 can easily transmit the driving force of the bevel gear mechanisms 15A and 15B to the axle 37 by the power transmission mechanisms 81A and 81B.

REFERENCE SIGNS LIST 11 input unit
12 turning part
13 spur gear mechanism (transmission mechanism)
13A first spur gear mechanism (first transmission mechanism)
13B second spur gear mechanism (second transmission mechanism)
14 output unit
15 bevel gear mechanism (power conversion mechanism)
15A first bevel gear mechanism (first power conversion mechanism)
15B second bevel gear mechanism (second power conversion mechanism)
16 wheel
17 helical gear mechanism (power conversion mechanism)
17A first helical gear mechanism (first power conversion mechanism)
17B second helical gear mechanism (second power conversion mechanism)
18 worm gear mechanism (power conversion mechanism)
18A first worm gear mechanism (first power conversion mechanism)
18B second worm gear mechanism (second power conversion mechanism)
19 crown gear mechanism (power conversion mechanism)
19A first crown gear mechanism (first power conversion mechanism)
19B second crown gear mechanism (second power conversion mechanism)
20 universal joint mechanism
20A first universal joint mechanism
20B second universal joint mechanism
30 motor
31 support cylinder
32A first rotating cylinder
32B second rotating cylinder
33A bearing
33B bearing
34A first input shaft
34B second input shaft 35 pivot shaft
36A first support member
36B second support member
37 axle
38A first drive spur gear
38B second drive spur gear
39A first driven spur gear
39B second driven spur gear
40A first output shaft
40B second output shaft
41A first drive bevel gear
41B second drive bevel gear
42A first driven bevel gear
42B second driven bevel gear
43, 44, 45 bearing
81 power transmission mechanism
81A first power transmission mechanism
81B second power transmission mechanism
91 connection shaft
92A first drive pulley
92B second drive pulley
93A first driven pulley
93B second driven pulley
94A first drive belt
94B second drive belt
100 cart
100A cart main body
102 handle part
103, 121 drive wheel
104 power supply unit
105 control device
106 operation unit

The invention claimed is:

1. A drive wheel, comprising:
a first input shaft and a second input shaft coaxially disposed;
a first output shaft and a second output shaft independently and rotatably disposed on different axes;
a first transmission mechanism that transmits rotational force of the first input shaft to the first output shaft;
a second transmission mechanism that transmits rotational force of the second input shaft to the second output shaft;
a wheel connected to an axle;
a pivot shaft that supports the wheel in a pivotable manner via the axle;
a first power conversion mechanism that transmits the rotational force of the first output shaft to one end portion of the axle; and
a second power conversion mechanism that transmits the rotational force of the second output shaft to another end portion of the axle,
a rotational axial center of the wheel along a vertical direction intersecting an axial center of the axle being arranged shifted in a horizontal direction orthogonal to the axial center of the axle with respect to an axial center of the pivot shaft, the rotational axial center being on a plane having the axial center of the pivot shaft and orthogonal to the axial center of the axle, wherein
when a radius R1 of the wheel, center distance R2 between the rotational axial center and the axial center of the pivot shaft, rotational frequency n1 of the wheel, rotational frequency n2 of the pivot shaft, rotational speed V1 of the wheel, and steering rotational speed V2 of the wheel rolling on a floor surface while turning the pivot shaft satisfy V1=V2,
relations of V1=2π×R1×n1, V2=2π×R2×n2, and n1=n2 (R2/R1) are satisfied,
wherein a reduction ratio of the first power conversion mechanism and the second power conversion mechanism or a gear ratio of meshing gears of the first power conversion mechanism and the second power conversion mechanism is in a relation of (R2/R1)±10%.

2. The drive wheel according to claim 1, wherein the first output shaft and the second output shaft are arranged on both sides in an axial center direction of the axle with respect to the wheel.

3. The drive wheel according to claim 1, wherein the first power conversion mechanism and the second power conversion mechanism are arranged on both sides in the axial center direction of the axle with respect to the wheel.

4. The drive wheel according to claim 3, wherein the first power conversion mechanism and the second power conversion mechanism are arranged on an upper side in a vertical direction intersecting the axial center direction of the axle.

5. The drive wheel according to claim 4, wherein a first power transmission mechanism is provided between the first power conversion mechanism and one end portion of the axle, and a second power transmission mechanism is provided between the second power conversion mechanism and another end portion of the axle.

6. The drive wheel according to claim 1, wherein
the first power conversion mechanism transmits the rotational force of the first output shaft to one end portion of the axle the axial center direction of which is different from that of the first output shaft, and to which one of a bevel gear mechanism, a helical gear mechanism, a worm gear mechanism, a crown gear mechanism, and a universal joint mechanism is applied, and
the second power conversion mechanism transmits the rotational force of the second output shaft to one end portion of the axle the axial center direction of which is different from that of the second output shaft, and to which one of a bevel gear mechanism, a helical gear mechanism, a worm gear mechanism, a crown gear mechanism, and a universal joint mechanism is applied.

7. The drive wheel according to claim 1, wherein in the pivot shaft, a first support member and a second support member are connected to both sides in the axial center direction of the axle with respect to the wheel, and in the axle, end portions in the axial center direction are rotatably supported by the first support member and the second support member.

8. A cart, comprising:
the drive wheel according to claim 1, and
a cart main body to which the drive wheel is fitted.

* * * * *